United States Patent
Sato et al.

(10) Patent No.: US 10,877,434 B2
(45) Date of Patent: *Dec. 29, 2020

(54) CARTRIDGE, ROTARY UNIT, AND IMAGE FORMING APPARATUS

(71) Applicant: CANON KABUSHIKI KAISHA, Tokyo (JP)

(72) Inventors: Kensuke Sato, Yokohama (JP); Tetsushi Uneme, Kawasaki (JP); Toshiki Fujino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,179

(22) Filed: Sep. 11, 2019

(65) Prior Publication Data

US 2020/0004199 A1 Jan. 2, 2020

Related U.S. Application Data

(60) Division of application No. 16/150,047, filed on Oct. 2, 2018, now Pat. No. 10,444,702, which is a
(Continued)

(30) Foreign Application Priority Data

Feb. 27, 2015 (JP) .................................. 2015-039424

(51) Int. Cl.
*G03G 21/18* (2006.01)
*G03G 15/08* (2006.01)
(Continued)

(52) U.S. Cl.
CPC ........... *G03G 21/186* (2013.01); *F16D 1/101* (2013.01); *G03G 15/0121* (2013.01);
(Continued)

(58) Field of Classification Search
CPC ........... G03G 15/0891; G03G 15/0865; G03G 15/757; G03G 21/1857; G03G 2221/1657; G03G 21/1647; G03G 21/186
See application file for complete search history.

(56) References Cited

U.S. PATENT DOCUMENTS 8,437,669 B2   5/2013   Morioka et al.
10,120,332 B2 * 11/2018  Sato ..................... G03G 21/186
(Continued)

FOREIGN PATENT DOCUMENTS

JP   S51-060846 A   5/1976
JP   S59-034117 U   3/1984
(Continued)

OTHER PUBLICATIONS

Notice of Allowance in Korean Patent Application No. 10-2019-0058520, dated Jul. 15, 2019.
(Continued)

*Primary Examiner* — Sandra Brase
(74) *Attorney, Agent, or Firm* — Venable LLP

(57) ABSTRACT

A cartridge includes a coupling member, a transmitted member, and a rotary member. The transmitted member includes an accommodating portion configured to accommodate the coupling member, and a protruded portion integrally formed with an inner wall of the accommodating portion and protruding from the inner wall toward an inside of the accommodating portion. The coupling member includes a free end portion having a rotational force receiving portion that receives a rotational force, a connected portion connected to the transmitted member in such a manner that at least a part of the connected portion can be accommodated in the accommodating portion, and a recessed portion provided at the connected portion so that the protruded portion can enter. An inclination angle of a
(Continued)

rotation axis of the coupling member relative to a rotation axis of the transmitted member is variable.

36 Claims, 34 Drawing Sheets

Related U.S. Application Data continuation of application No. 15/590,782, filed on May 9, 2017, now Pat. No. 10,120,332, which is a continuation of application No. 15/052,259, filed on Feb. 24, 2016, now Pat. No. 9,678,457.

(51) Int. Cl.
    *G03G 21/16*     (2006.01)
    *G03G 15/01*     (2006.01)
    *G03G 15/00*     (2006.01)
    *F16D 1/10*     (2006.01)

(52) U.S. Cl.
    CPC ....... *G03G 15/0891* (2013.01); *G03G 15/757* (2013.01); *G03G 21/1647* (2013.01); *G03G 21/1671* (2013.01); *G03G 2221/1657* (2013.01)

(56) References Cited

U.S. PATENT DOCUMENTS

| 10,444,702 | B2* | 10/2019 | Sato ............... G03G 15/0891 |
| 2008/0152388 | A1 | 6/2008 | Ueno et al. |
| 2009/0317134 | A1 | 12/2009 | Miyabe et al. |
| 2014/0270845 | A1 | 9/2014 | Kawakami et al. |
| 2015/0093150 | A1 | 4/2015 | Xiao et al. |
| 2015/0346671 | A1 | 12/2015 | Ikeda |

FOREIGN PATENT DOCUMENTS

| JP | H05-134482 A | 5/1993 |
| JP | 8157061 B2 | 4/2001 |
| JP | 2008-233867 A | 10/2008 |
| JP | 2014-098935 A | 5/2014 |
| JP | 2014-112169 A | 6/2014 |
| JP | 2014-157213 A | 8/2014 |
| KR | 101982107 B1 | 5/2019 |

OTHER PUBLICATIONS

Jul. 27, 2020 Notice of Allowance in Korean Patent Application No. 10-2019-0126788.

* cited by examiner

FIG.12A1
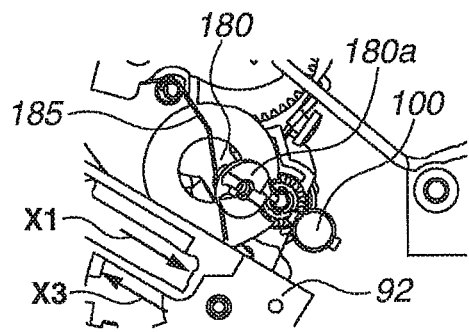
FIG.12B1
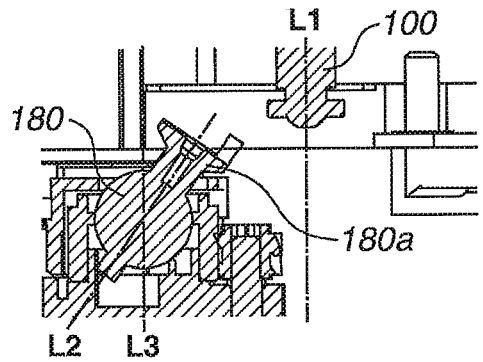
FIG.12A2
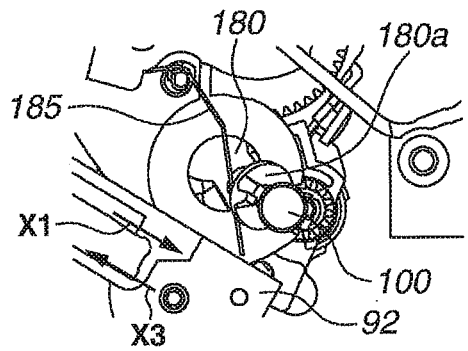
FIG.12B2
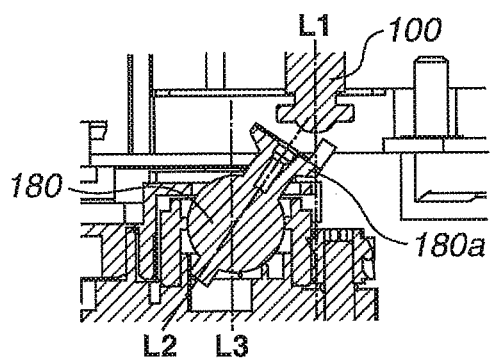
FIG.12A3
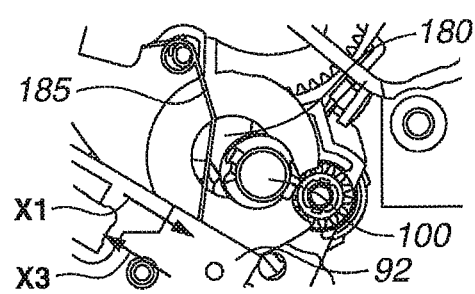
FIG.12B3
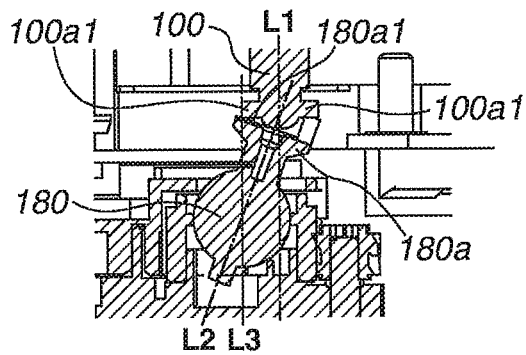
FIG.12A4
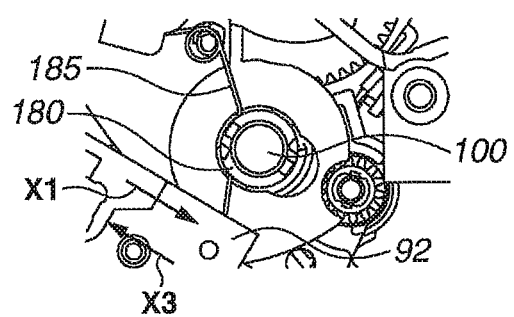
FIG.12B4
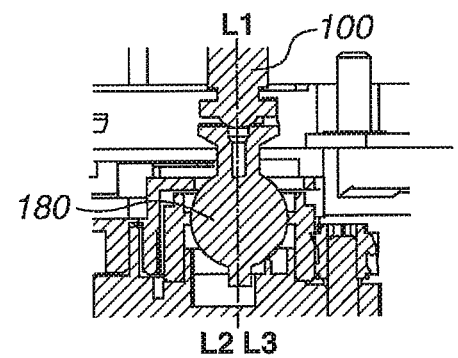

FIG.21A1
FIG.21B1
FIG.21A2
FIG.21B2
FIG.21A3
FIG.21B3
FIG.21A4
FIG.21B4
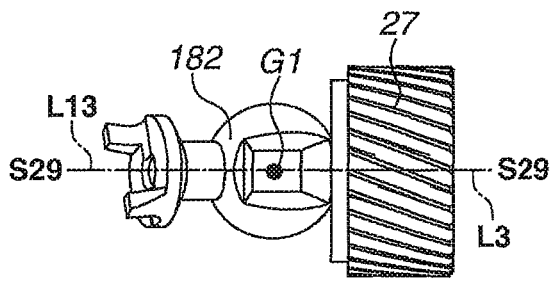
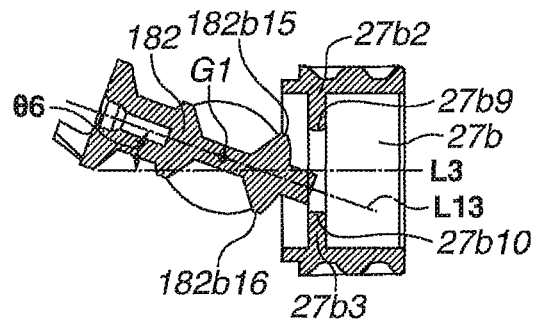
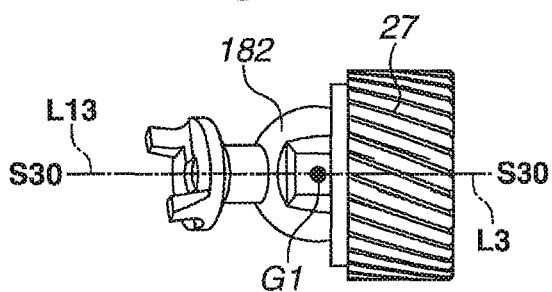
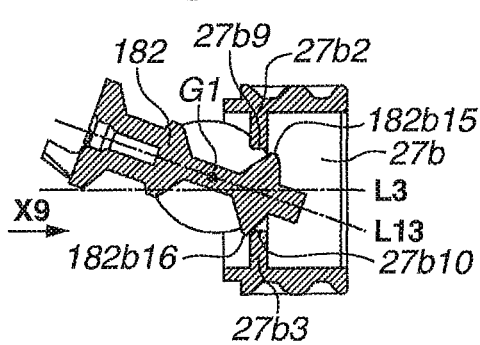
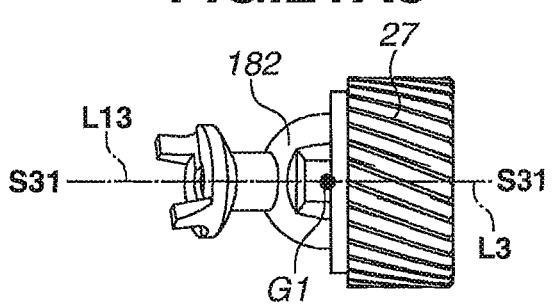
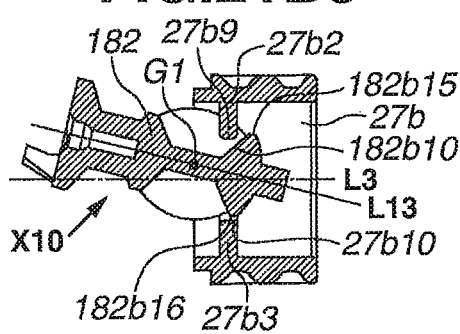
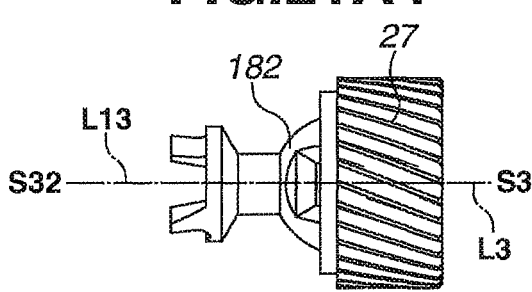
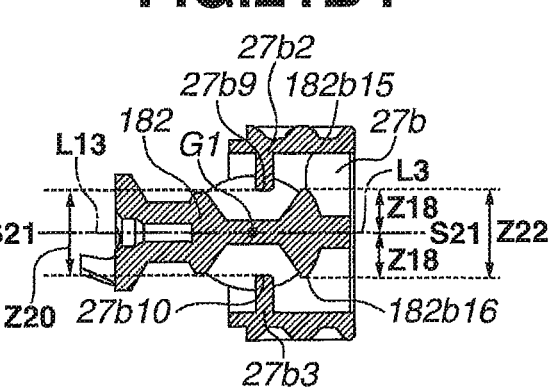

CARTRIDGE, ROTARY UNIT, AND IMAGE FORMING APPARATUS

BACKGROUND OF THE INVENTION

Field of the Invention

The present invention relates to an image forming apparatus. Further, the present invention relates to an image forming system.

The image forming apparatus is generally configured to form an image on a recording medium. The image forming apparatus is, for example, an electrophotographic copying machine, an electrophotographic printer (e.g., a laser beam printer or a light emitting diode (LED) printer), or a facsimile apparatus, which can form an image through electrophotographic image forming processes. In general, the image forming apparatus is associated with a cartridge that is attachable to or detachable from an apparatus body thereof.

Description of the Related Art

There is a conventional developing device the maintenance for which is wholly performed by a service engineer of an office equipment supplier that has installed an electrophotographic image forming apparatus. On the other hand, a cartridge type is employable to enable each user to attach and detach the developing device to and from the electrophotographic image forming apparatus body. The cartridge type is useful in that the operability can be improved extremely because a user can perform the maintenance for the apparatus without relying on any service engineer. Therefore, the above-mentioned cartridge type has been widely employed for various electrophotographic image forming apparatuses.

The electrophotographic image forming apparatus includes a main body side engaging portion provided in the apparatus body to transmit a rotational force to a rotary member (e.g., an electrophotographic photosensitive drum or a developer carrier).

Further, a configuration for causing a coupling member provided on a process cartridge to engage with the main body side engaging portion to transmit the rotational force is conventionally known.

The above-mentioned coupling member, which is capable of serving as a rotational force transmission unit, can be configured to incline from a rotation axis of an electrophotographic photosensitive drum unit. According to such a conventionally known configuration, an engagement operation or a disengagement operation of the coupling member can be realized in the process of attaching or detaching the process cartridge to or from the apparatus body. The above-mentioned configurations are discussed in Japanese Patent No. 4498407, Japanese Patent Application Laid-Open No. 2014-98935, and Japanese Patent Application Laid-Open No. 2014-112169.

According to the configuration discussed in Japanese Patent No. 4498407, a coupling member can incline from a drum flange member serving as a rotational force transmitted member in a state where these members are connected to each other. More specifically, the coupling member is configured to have a bevel shape and an axial member provided on the drum flange member is configured to receive the coupling member in such a way as to enable the coupling member to incline relative to the drum flange member.

Further, according to the configuration discussed in Japanese Patent Application Laid-Open No. 2014-98935, a coupling member includes a spherical portion that serves as an inclination center. When the spherical portion is assembled with an accommodating portion provided in a drum flange member, the coupling member can be connected to the drum flange member so that the coupling member can incline relative to the drum flange member.

The spherical portion of the coupling member includes a protrusion that can transmit a rotational driving force to the drum flange member. The drum flange member includes an aperture having a diameter smaller than that of the spherical portion. The spherical portion can be brought into contact with an inner periphery of the aperture. Thus, it is feasible to hinder the coupling member from separating from the drum flange member. However, according to the above-mentioned configuration, it is necessary to design the accommodating portion carefully to prevent the inner periphery of the aperture from colliding with the protrusion of the spherical portion, and to incline the coupling member sufficiently. Therefore, the accommodating portion of the drum flange member tends to become greater.

In view of the foregoing, the configuration discussed in Japanese Patent Application Laid-Open No. 2014-112169 is characterized by causing a pin member to enter a through-hole of the spherical portion of the coupling member, instead of using the protrusion having the above-mentioned configuration. Further, the pin member is fixed to the drum flange member in such a way as to enable the coupling member to incline. According to the above-mentioned configuration, the pin member does not contact with the accommodating portion when the coupling member inclines, because the pin member is fixed to the drum flange member. On the other hand, the total number of parts increases because of the pin member, which is newly added to the coupling member and the drum flange member. Further, it is necessary to provide a sufficient clearance between the coupling member and the pin member. Therefore, the assembling work is rather complicated because it is necessary to hold both of the coupling member and the pin member when the coupling member and the pin member are assembled to the drum flange member.

SUMMARY OF THE INVENTION

The present invention is directed to a technique capable of improving the assembling of a cartridge with an image forming apparatus in a case where a coupling member is connected to a transmitted member so that the coupling member can incline relative to the transmitted member.

According to an aspect of the present invention, a cartridge attachable to and detachable from an apparatus body of an image forming apparatus, includes a coupling member configured to receive a rotational force when the coupling member engages with a driving member provided on the apparatus body, a transmitted member that includes an accommodating portion configured to accommodate the coupling member, a protruded portion integrally formed with an inner wall of the accommodating portion and protruding from the inner wall toward an inside of the accommodating portion, and is configured to receive the rotational force from the coupling member, and a rotary member configured to rotate while carrying a developer when the rotational force received by the transmitted member is transmitted to the rotary member. The coupling member includes a free end portion having a rotational force receiving portion that can be brought into contact with the driving member to receive the rotational force, a connected portion connected to the transmitted member in such a manner that at least a part of the connected portion can be accommodated in the accommodating portion, and a recessed portion provided at the connected portion so that the protruded portion can enter. An inclination angle of a rotation axis of the coupling member relative to a rotation axis of the transmitted member is variable.

Further features of the present invention will become apparent from the following description of exemplary embodiments with reference to the attached drawings.

BRIEF DESCRIPTION OF THE DRAWINGS

FIGS. 12A1 to 12A4 and FIGS. 12B1 to 12B4 illustrate a process of engaging the coupling member with a main body side driving member when the developing cartridge is installed in the apparatus body.

FIGS. 21A1 to 21A4 and FIGS. 21B1 to 21B4 illustrate a method for assembling the coupling member with the drive input gear.

FIGS. 29A and 29B are perspective views illustrating the developing cartridge seen from the driving side thereof, in which FIG. 29A illustrates a coupling member in a driving posture and FIG. 29B illustrates a coupling member in an inclined posture.

FIGS. 31A and 31B are exploded perspective views illustrating a driving force transmission unit, in which FIG. 31A illustrates the driving force transmission unit seen from a driving side thereof and FIG. 31B illustrates the driving force transmission unit seen from a non-driving side thereof.

DESCRIPTION OF THE EMBODIMENTS

Figure 1A:
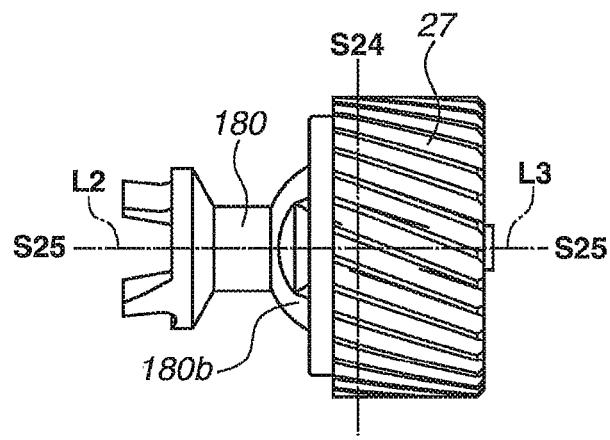
FIG. 1A is a side view and FIGS. 1B and 1C are cross-sectional views, which illustrate a coupling member assembled with a drive input gear.

Hereinafter, the exemplary embodiments for carrying out the present invention will be described in detail below with reference to attached drawings. However, functions, materials, shapes, and relative positioning of constituent components described in the following exemplary embodiments do not intend to limit the scope of the present invention narrowly, unless otherwise mentioned. Further, if a constituent member is once described, initially mentioned material and shape thereof should be referred to in the following description, unless otherwise mentioned.

Hereinafter, a first exemplary embodiment will be described in detail below. A cartridge and an electrophotographic image forming apparatus according to the present invention will be described in detail below with reference to attached drawings. For example, the electrophotographic image forming apparatus is constituted by a laser beam printer. A drum cartridge and a developing cartridge are attachable to and detachable from an apparatus body of the laser beam printer. In the following description, the longitudinal directions of the drum cartridge and the developing cartridge are substantially parallel to a rotation axis direction L1 of a photosensitive drum and a rotation axis L0 of a developing roller. Further, a rotation axis L10 of the photosensitive drum and the rotation axis L0 of the developing roller are intersectional to a recording medium conveyance direction. Further, transverse directions of the drum cartridge and the developing cartridge are substantially perpendicular to the rotation axis L10 of the photosensitive drum and the rotation axis L0 of the developing roller. In the present exemplary embodiment, the drum cartridge and the developing cartridge can be attached to and detached from the apparatus body of the laser beam printer along the transverse directions thereof. Further, reference numerals in the drawings are used to indicate constituent components and do not intend to narrowly limit the illustrated configuration.

(1) Entire Arrangement of Electrophotographic Image Forming Apparatus

Figure 2:
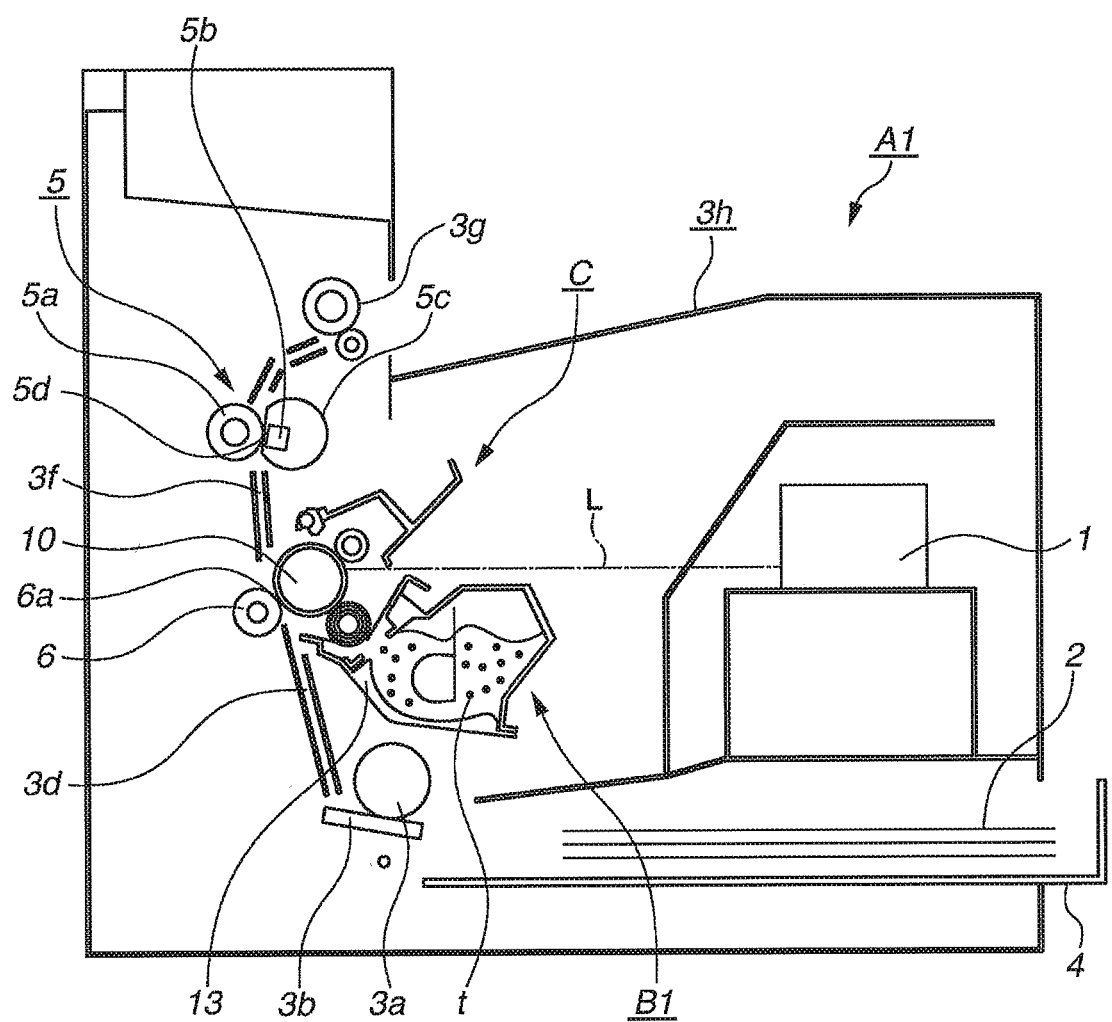
FIG. 2 illustrates a cross-sectional side view illustrating an electrophotographic image forming apparatus.

First, an entire configuration of the electrophotographic image forming apparatus according to an exemplary embodiment of the present invention will be described in detail below with reference to FIG. 2. FIG. 2 illustrates a cross-sectional side view illustrating the electrophotographic image forming apparatus.

The electrophotographic image forming apparatus illustrated in FIG. 2 can form an image on a recording medium 2 with a developer through electrophotographic image forming processes based on image information received from an external device (e.g., a personal computer). Further, the electrophotographic image forming apparatus includes a developing cartridge B1 and a drum cartridge C, which can be attached to and detached from an apparatus body A1 by a user. An example of the recording medium 2 is a recording paper, a label paper, an OHP sheet, or a cloth. Further, the developing cartridge B1 includes a developing roller 13. The drum cartridge C includes a photosensitive drum (i.e., a photosensitive member) 10 and a charging roller 11.

When a predetermined voltage is applied from the apparatus body A1, the charging roller 11 uniformly charges a surface of the photosensitive drum 10. Then, the charged photosensitive drum 10 is irradiated with a laser beam L corresponding to image information received from the optical unit 1. An electrostatic latent image can be formed on the photosensitive drum 10 according to the received image information. Then, a developing unit described below develops the electrostatic latent image with the developer t. Thus, a developer image can be formed on the surface of the photosensitive drum 10.

On the other hand, each recording medium 2 accommodated in a paper feeding tray 4 can be fed, being separated one by one by a paper feeding roller 3a and a separation pad 3b, which is in a pressure contact with the paper feeding roller 3a, in synchronization with formation of the developer image. Then, a conveyance guide 3d conveys the recording medium 2 to a transfer roller 6, which serves as a transfer unit. The transfer roller 6 is urged toward the surface of the photosensitive drum 10 so that transfer roller 6 can constantly contact with the photosensitive drum 10.

Next, the recording medium 2 passes through a transfer nip portion 6a formed between the photosensitive drum 10 and the transfer roller 6. In this state, a voltage having a polarity opposite to that of the developer image is applied to the transfer roller 6, so that the developer image formed on the surface of the photosensitive drum 10 can be transferred onto the recording medium 2.

A conveyance guide 3f conveys the recording medium 2 on which the developer image has been transferred, to a fixing unit 5. The fixing unit 5 includes a driving roller 5a and a fixing roller 5c in which a heater 5b is provided. When the recording medium 2 passes through a nip portion 5d formed between the driving roller 5a and the fixing roller 5c, heat and pressure are applied to the recording medium 2 so that the developer image transferred on the recording medium 2 can be fixed to the recording medium 2. As a result, a visible image can be formed on the recording medium 2.

Subsequently, the recording medium 2 is conveyed by a discharge roller pair 3g and discharged to a discharge portion 3h.

(2) Electrophotographic Image Forming Processes

Figure 3:
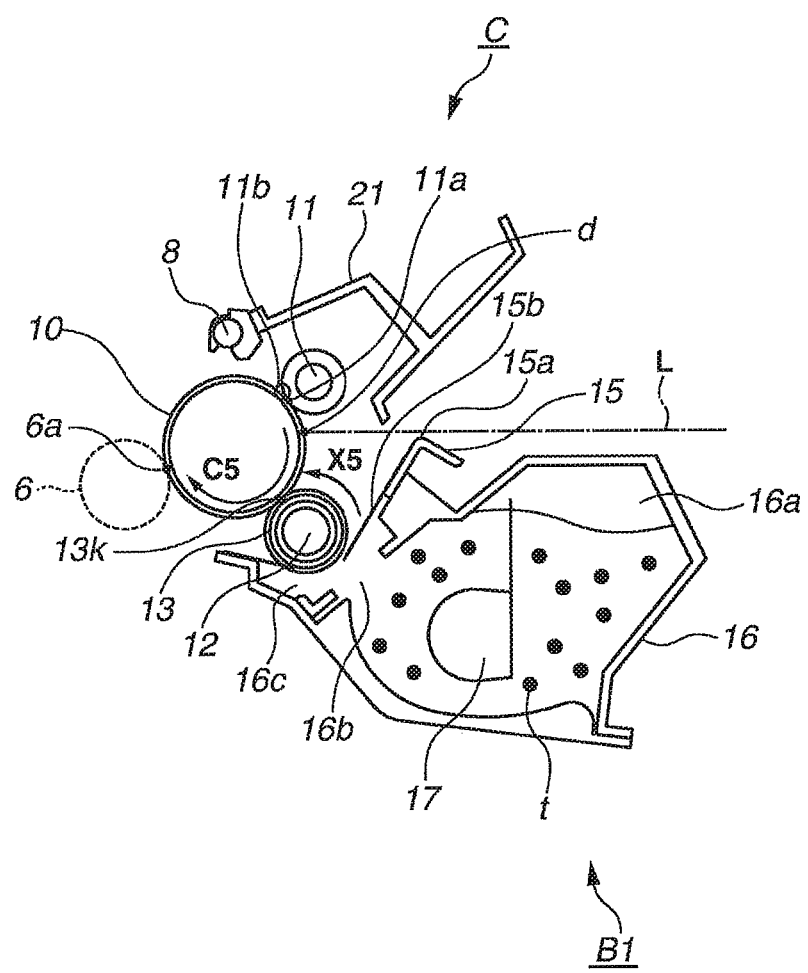
FIG. 3 is a cross-sectional view illustrating a developing cartridge and a drum cartridge.

Next, the electrophotographic image forming processes according to an exemplary embodiment of the present invention will be described in detail below with reference to FIG. 3. FIG. 3 illustrates a side cross-sectional view illustrating the developing cartridge B1 and the drum cartridge C.

As illustrated in FIG. 3, the developing cartridge B1 includes a developing container 16, which is associated with the developing roller 13 serving as the developing unit and a developing blade 15. Further, the drum cartridge C includes a cleaning frame body 21, in which the photosensitive drum 10 and the charging roller 11 are provided.

A developer conveyance member 17, which is rotatably supported by the developing container 16, conveys the developer t accommodated in a developer storing portion 16a of the developing container 16 to the inside of the developing chamber 16c via an aperture 16b of the developing container 16. The developing roller 13, which contains a magnet roller 12 provided in an inner space thereof, is associated with the developing container 16. The magnet roller 12 generates a magnetic force that attracts the developer t of the developing chamber 16a to a surface of the developing roller 13.

Further, the developing blade 15 is constituted by a support member 15a, which is made of a metal plate, and an elastic member 15b, which is made of a urethane rubber or a SUS plate. The elastic member 15b is elastically deformable and generates a predetermined contact pressure when the elastic member 15b contacts the developing roller 13. The developing roller 13 rotates in a rotational direction X5 to regulate the amount of the developer t that adheres to the surface of the developing roller 13 and apply frictional electrification charges to the developer t. Thus, a developer layer can be formed on the surface of the developing roller 13. When the developing roller 13 rotates in the rotational direction X5 in a state where the voltage is applied from the apparatus body A1, the developer t can be supplied to a developing region of the photosensitive drum 10.

The charging roller 11, which is rotatably supported by the cleaning frame body 21 and urged appropriately, is in contact with an outer cylindrical surface of the photosensitive drum 10. In a state where an appropriate voltage is applied from the apparatus body A1, the charging roller 11 uniformly charges the surface of the photosensitive drum 10. The voltage to be applied to the charging roller 11 is set beforehand in such a manner that a potential difference between the surface of the photosensitive drum 10 and the charging roller 11 becomes equal to or greater than a discharge start voltage. More specifically, a DC voltage of −1300 V is applied as the charging bias. In this case, the surface of the photosensitive drum 10 is uniformly contact-charged to have a charging bias potential (i.e., a dark part potential) of −700V. Further, in the present exemplary embodiment, the charging roller 11 is driven and rotates around a rotational axis thereof while the photosensitive drum 10 rotates (as described in detail below). Then, the electrostatic latent image is formed on the surface of the photosensitive drum 10 with the laser beam L emitted from the optical unit 1. Then, the developer image is formed in the developing region of the photosensitive drum 10 by transferring the developer t according to the electrostatic latent image on the photosensitive drum 10 so that the electrostatic latent image can be visualized.

More specifically, the developing roller 13 is a developer carrier that rotates in a state where the developer (i.e., toner particles) adheres to a surface thereof (i.e., in a developer carrying state) and develops the latent image on the photosensitive drum 10 with the developer carried thereon.

Further, the photosensitive drum 10 is an image carrier that carries the developer image formed by the developing roller 13.

The developing roller 13 and the photosensitive drum 10 are rotary members that can rotate around their rotational axes in the developer carrying state.

(3) Configuration of Developing Cartridge B1

Next, a practical configuration of the developing cartridge B1 according to an exemplary embodiment of the present invention will be described in detail below with reference to the attached drawings. The developing cartridge B1 is a device body of a developing device (i.e., the developing unit) capable of developing a latent image formed on the photosensitive drum 10, which is configured as a cartridge that can be attached to and detached from the apparatus body of the image forming apparatus.

Figure 1B:
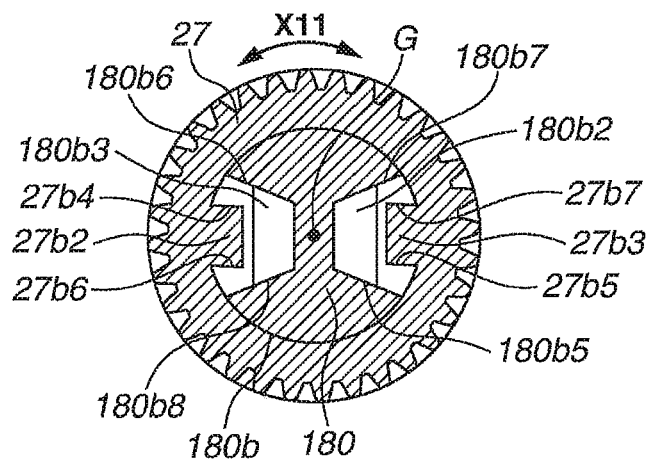
Figure 1C:
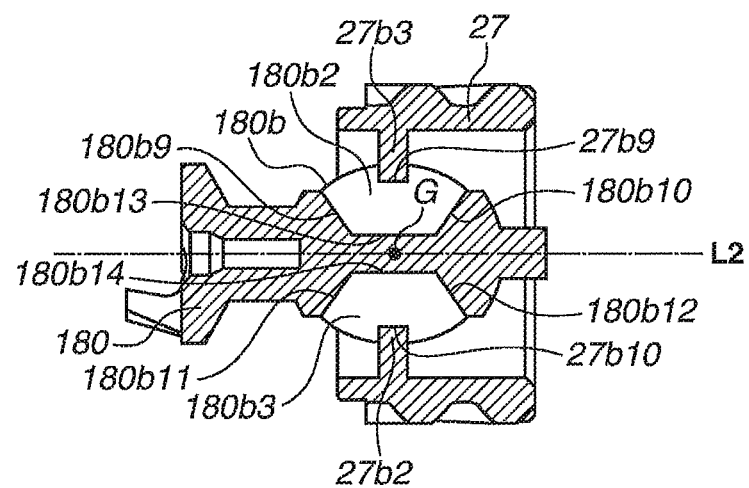
Figure 4:
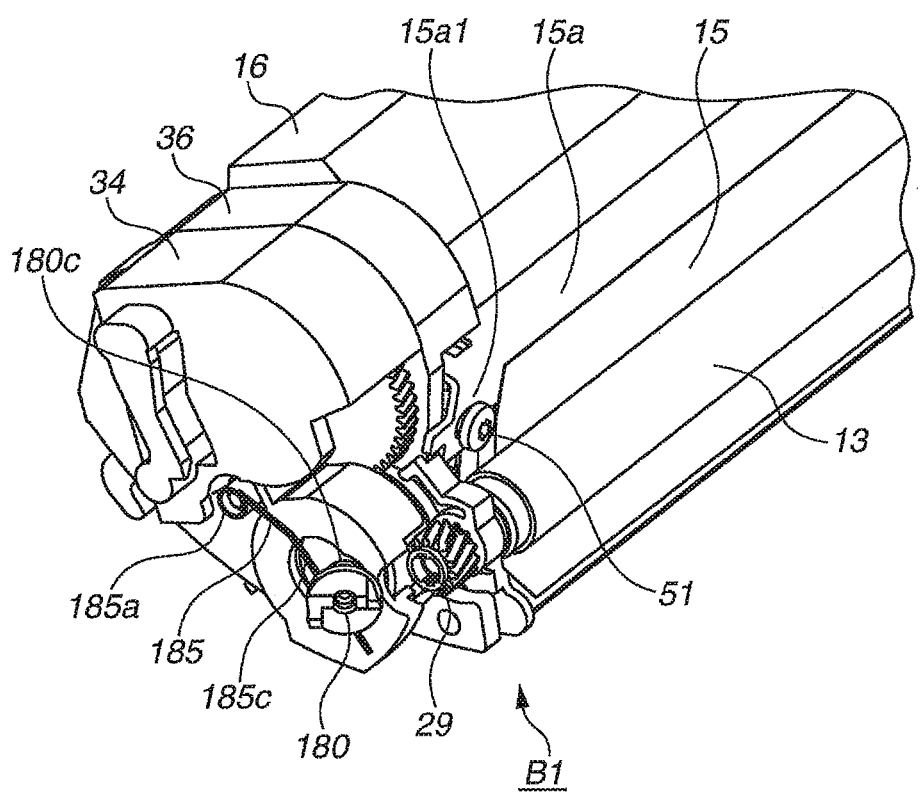
FIG. 4 is a perspective view illustrating the developing cartridge, which is seen from a driving side thereof.
Figure 5:
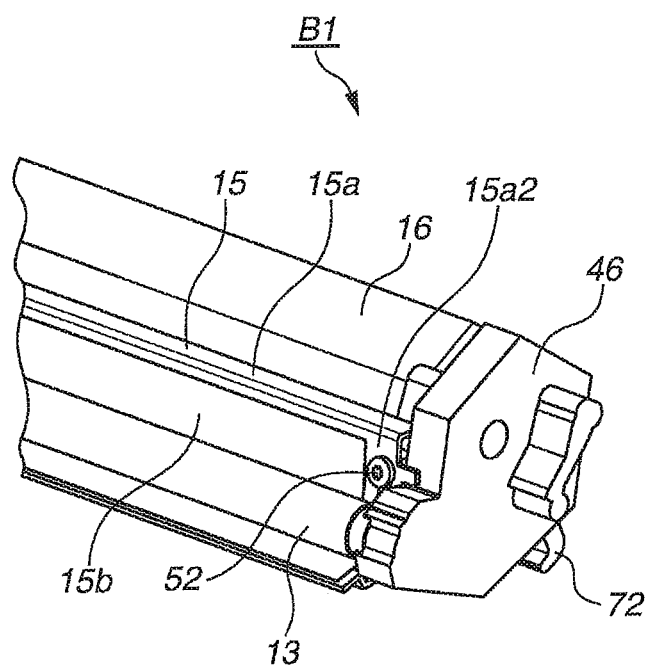
FIG. 5 is a perspective view illustrating the developing cartridge, which is seen from a non-driving side thereof.
Figure 6A:
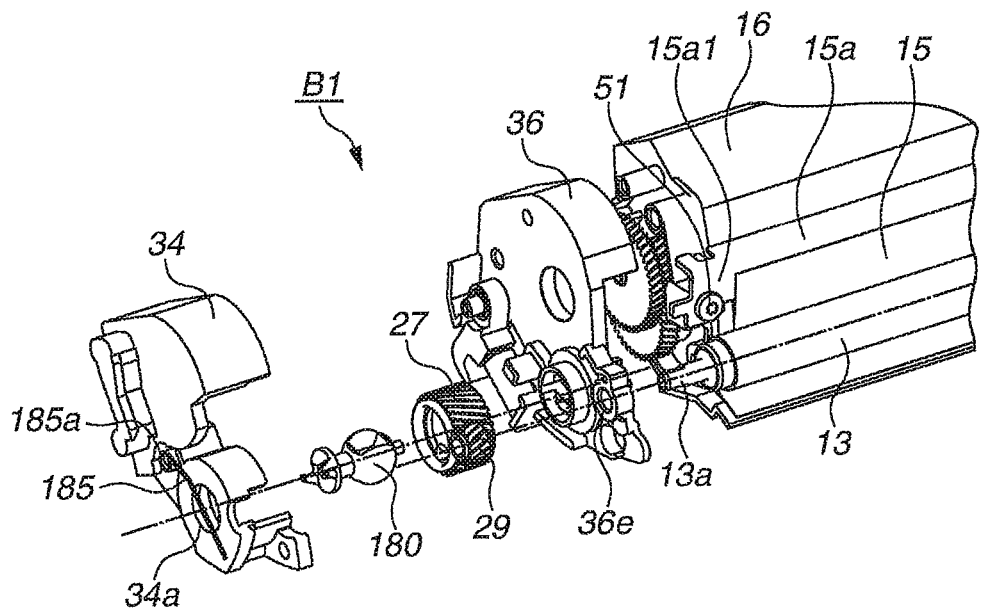
FIGS. 6A and 6B are exploded perspective views illustrating the driving side of the developing cartridge.
Figure 6B:
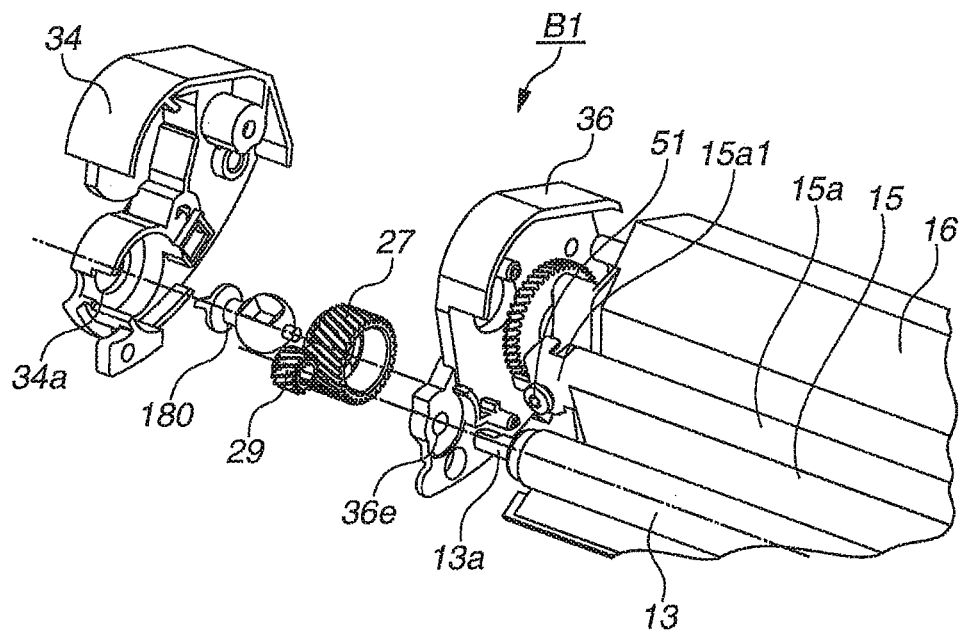
Figure 7A:
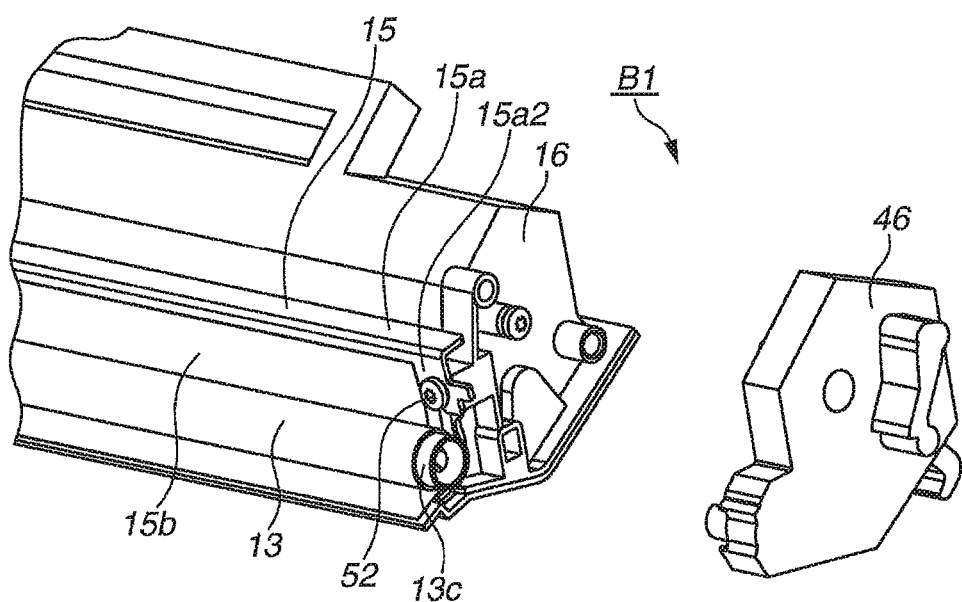
FIGS. 7A and 7B are exploded perspective views illustrating the non-driving side of the developing cartridge.
Figure 7B:
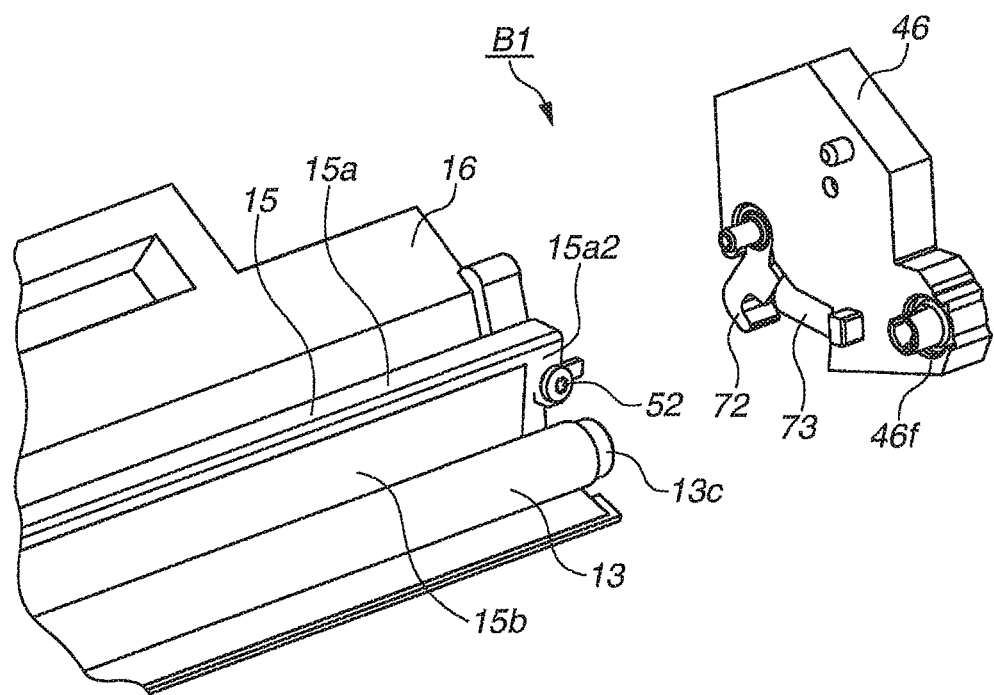
Figure 8A:
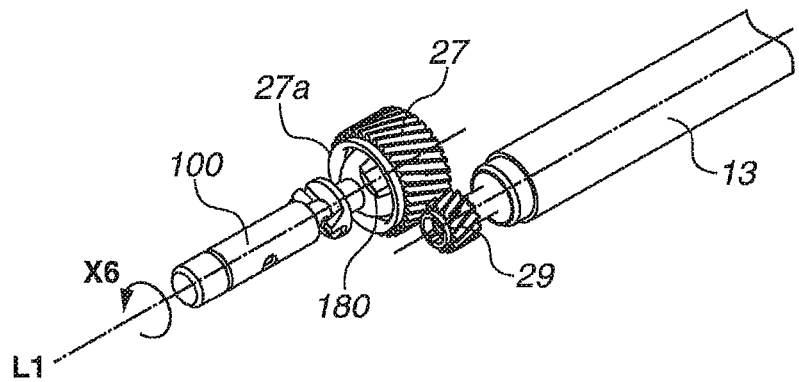
FIGS. 8A to 8D illustrate peripheral components of the coupling member.
Figure 8B:
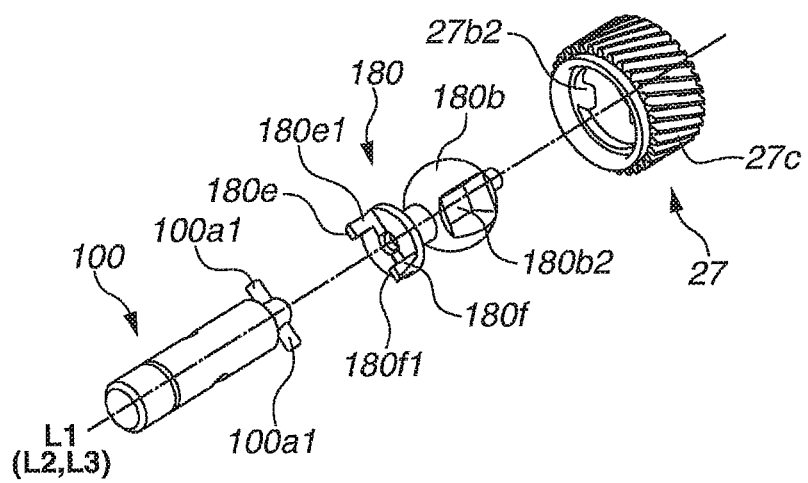
Figure 8C:
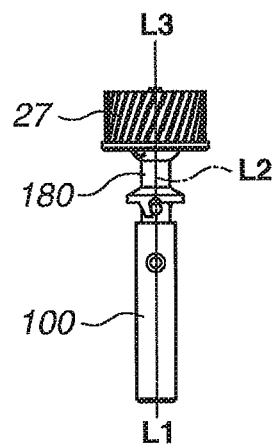
Figure 8D:
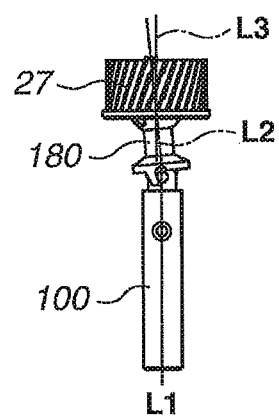
Figure 9:
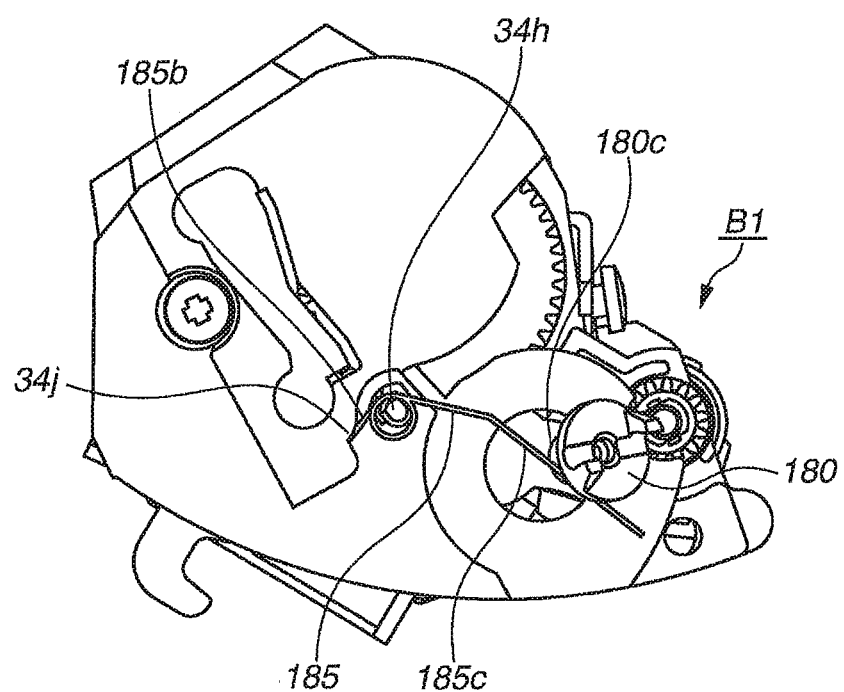
FIG. 9 is a side view illustrating a practical configuration of a coupling spring of the developing cartridge.

In the following description, a side in the longitudinal direction at which the rotational force can be transmitted from the apparatus body A1 to the developing cartridge B1 is referred to as "driving side." The opposite side is referred to as "non-driving side." FIG. 4 is a perspective view illustrating the developing cartridge B1, which is seen from a driving side thereof. FIG. 5 is a perspective view illustrating the developing cartridge B1, which is seen from a non-driving side thereof. FIG. 6A is an exploded perspective view illustrating the driving side of the developing cartridge B1, which is seen from a viewpoint positioned outward from the driving side. FIG. 6B is an exploded perspective view illustrating the driving side of the developing cartridge B1, which is seen from a viewpoint positioned inward from the driving side. FIG. 7A is an exploded perspective view illustrating the non-driving side of the developing cartridge B1, which is seen from a viewpoint positioned outward from the non-driving side. FIG. 7B is an exploded perspective view illustrating the non-driving side of the developing cartridge B1, which is seen from a viewpoint positioned inward from the non-driving side. FIG. 1A is a side view illustrating a coupling member 180 and a drive input gear 27 that are assembled with each other. FIG. 1B is a cross-sectional view illustrating the coupling member 180 and the drive input gear 27, which is taken along a cutting plane line S24-S24 illustrated in FIG. 1A. FIG. 1C is a cross-sectional view illustrating the coupling member 180 and the drive input gear 27, which is taken along a cutting plane line S25-S25 illustrated in FIG. 1A. FIG. 8A illustrates a main body side driving member (i.e., a driving member) 100, the developing roller 13, a developing roller gear 29, the drive input gear 27, the coupling member 180, although other constituent components of the developing cartridge B1 are not illustrated. FIG. 8A is a perspective view illustrating the vicinity of the coupling member 180. FIG. 8B is an exploded perspective view illustrating respective constituent components. Each of FIGS. 8C and 8D illustrates an engaged state of the coupling member 180 and the main body side driving member 100. FIG. 9 is a side view illustrating the developing cartridge B1, seen from the driving side thereof.

As illustrated in FIGS. 6A, 6B, 7A, and 7B, the developing cartridge B1 includes the developing roller 13 and the developing blade 15. The developing blade 15 includes a driving side end portion 15a1 and a non-driving side end portion 15a2 disposed at both ends of the support member 15a in the longitudinal direction and fixed to the developing container 16 with a screw 51 and a screw 52. A driving side developing bearing 36 and a non-driving side developing bearing 46 are disposed at both ends of the developing container 16 in the longitudinal direction thereof. The developing roller 13 can be rotatably supported when a driving side end portion 13a is fitted into a hole 36e of the driving side developing bearing 36 and a non-driving side end portion 13c is coupled with a support portion 46f of the non-driving side bearing 46. Further, at the driving side end portion 13a of the developing roller 13, the developing roller gear 29 is disposed coaxially with the developing roller 13 and outward from the driving side developing bearing 36 in the longitudinal direction, so that the developing roller 13 and the developing roller gear 29 can engage with each other and rotate integrally (see FIG. 4).

The driving side developing bearing 36 rotatably supports the drive input gear 27 at an outer side thereof in the longitudinal direction. The drive input gear 27 is in mesh with the developing roller gear 29.

Further, the coupling member 180 is provided coaxially with the drive input gear 27.

A developing side cover 34 is provided at a driving side distal end portion of the developing cartridge B1 in such a way as to cover the drive input gear 27 from the outside in the longitudinal direction.

More specifically, the developing side cover 34 is a cover member that covers one end side of the developing cartridge B1 in the longitudinal direction of the developing roller.

The coupling member 180 protrudes outward via a hole 34a of the developing side cover 34 in the longitudinal direction. Although described in detail below, the coupling member 180 engages with the main body side driving member 100 provided on the apparatus body A1 so that the rotational force can be transmitted. Further, the rotational force can be transmitted to the drive input gear 27 via the connected portion 180b of the coupling member 180. As a result, the rotational force input to the coupling member 180 can be transmitted to the developing roller 13 via the drive input gear 27 and the developing roller gear 29.

The coupling member 180 and a peripheral configuration thereof will be described in detail below with reference to the attached drawings.

As illustrated in FIGS. 6A and 6B, the coupling member 180, the drive input gear 27, and a coupling spring 185 are provided on the driving side of the developing cartridge B1. The coupling member 180 engages with the main body side driving member 100 provided on the apparatus body A1 so that the rotational force can be transmitted to the coupling member 180. Further, the driving force can be transmitted from the coupling member 180 to the drive input gear 27 (i.e., a transmitted member).

More specifically, as illustrated in FIG. 8B, the coupling member 180 is mainly constituted by a free end portion 180a having rotational force receiving portions 180e1 and 180f1 and the connected portion 180b. The rotational force receiving portions 180e1 and 180f1 of the coupling member 180 are disposed outside a driving side end portion 27a of the drive input gear 27 in the longitudinal direction. When the main body side driving member 100 rotates in a forward rotation direction X6 around a rotation axis L1, a rotational force applying portion 100a1 of the main body side driving member 100 is brought into contact with the rotational force receiving portion 180e1. On the other hand, a rotational force applying portion 100a2 of the main body side driving member 100 is brought into contact with the rotational force receiving portion 180f1. Therefore, the rotational force can be transmitted from the main body side driving member 100 to the coupling member 180.

The connected portion 180b of the coupling member 180 is substantially spherical. An accommodating portion 27b on an inner cylindrical surface of the drive input gear 27 supports the connected portion 180b. Although described in detail below, the coupling member 180 is connected to the drive input gear 27, so that the coupling member 180 can incline relative to the drive input gear 27. More specifically, an inclination angle of the rotation axis of the coupling member 180 relative to the rotation axis of the drive input gear 27 is variable.

Further, the connected portion 180b of the coupling member 180 includes recessed portions 180b2 and 180b3 (see FIG. 1) that are provided to transmit the rotational force. The recessed portions 180b2 and 180b3 can contact protruded portions 27b2 and 27b3 (see FIG. 1) of the drive input gear 27. Each of the protruded portions 27b2 and 27b3 is a rotational force transmitted portion. Therefore, the coupling member 180 and the drive input gear 27 can be integrated. The drive input gear 27 rotates in the forward rotation direction X6 around the rotation axis L3 (as described in detail below).

As illustrated in FIG. 8C, the rotation axis L1 of the main body side driving member 100 is set to be coaxial with the rotation axis L3 of the drive input gear 27. However, due to unevenness in dimensions of constituent components, the rotation axis L1 of the main body side driving member 100 may slightly deviate from the rotation axis L3 of the drive input gear 27, as illustrated in FIG. 8D. In such a case, the rotational force can be transmitted from the main body side driving member 100 to the coupling member 180 while these members are rotating in a state where the rotation axis L2 of the coupling member 180 inclines from the rotation axis L3 of the drive input gear 27. The posture of the coupling member 180 in the above-mentioned state where the coupling member 180 can receive the driving force from the main body side driving member 100 is defined as "driving posture."

Further, as illustrated in FIG. 8A, the drive input gear 27 includes an integrally formed gear portion (i.e., a first gear) 27c, which is a helical gear or a spur gear. The gear portion 27c is coaxial with the rotation axis L3 of the drive input gear 27. The gear portion 27c is provided on an outer cylindrical surface of the drive input gear 27 (the accommodating portion 27b).

Further, the gear portion 27c meshes with a gear portion 29a of the developing roller gear 29. The developing roller gear 29 and the developing roller 13 rotate integrally. Therefore, the rotational force of the drive input gear 27 can be transmitted to the developing roller 13 via the developing roller gear 29. Further, the developing roller 13 rotates in the rotational direction X5 around the rotation axis L0.

Further, as illustrated in FIGS. 6 and 9, the coupling spring 185 is provided on the developing side cover 34. The coupling spring 185 is, for example, a torsion coil spring. A positioning portion 185a of the coupling spring 185 is supported by a spring accommodating portion 34h of the developing side cover 34. Further, one end portion 185b of the coupling spring 185 is fixed to a spring engaging portion 34j of the developing side cover 34. Further, under a restorative force of the coupling spring 185, the other end portion 185c of the coupling spring 185 is in contact with a linking portion 180c of the coupling member 180 in such a way as to inline the rotation axis L2 of the coupling member 180 from the rotation axis L3 of the drive input gear 27.

When an inclination regulating portion 180b4 provided on the rotation axis of the coupling member 180 collides with a regulating portion 36b1 of a regulating accommodating portion 36a of the driving side developing bearing 36, the coupling member 180 can be held in an inclined posture, as described in detail below. The posture of the coupling member 180 in the above-mentioned inclined state is defined as "inclined posture."

(4) Schematic Configuration of Drum Cartridge C

Figure 10A:
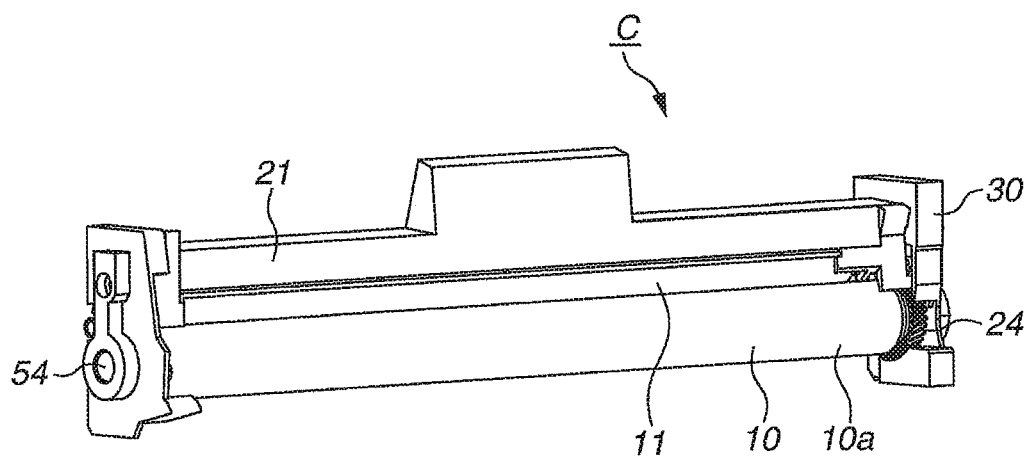
FIGS. 10A and 10B are perspective views illustrating the drum cartridge.
Figure 10B:
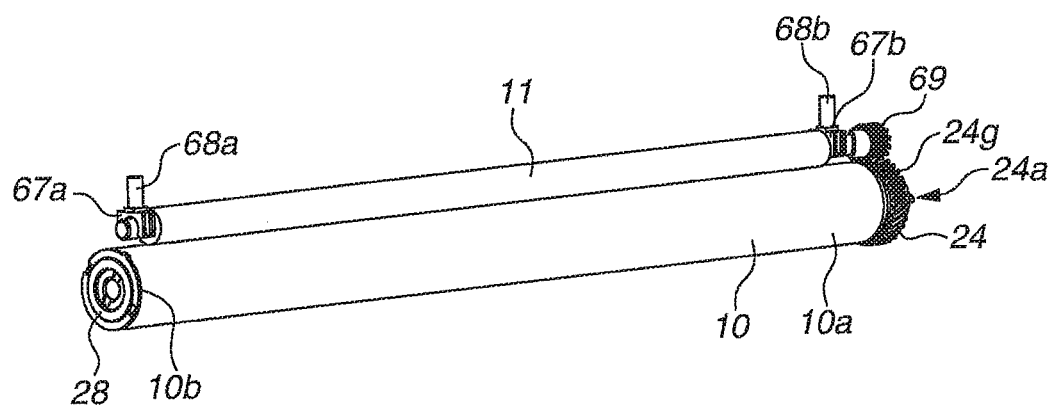

Next, a practical configuration of the drum cartridge C will be described in detail below with reference to FIGS. 10A and 10B. FIG. 10A is a perspective view illustrating the drum cartridge C, which is seen from a non-driving side thereof. FIG. 10B is a perspective view illustrating the photosensitive drum 10 and the charging roller 11, and peripheral components thereof, in a state where the cleaning frame body 21, a drum bearing 30, and a drum shaft 54 are removed.

The drum cartridge C includes the photosensitive drum 10 and the charging roller 11, as illustrated in FIGS. 10A and 10B. The charging roller 11 is rotatably supported by a charging roller bearing 67a and a charging roller bearing 67b and is urged against the photosensitive drum 10 by a charging roller urging member 68a and a charging roller urging member 68b.

A driving side flange 24 is integrally fixed to a driving side end portion 10a of the photosensitive drum 10. A non-driving side flange 28 is integrally fixed to a non-driving side end portion 10b of the photosensitive drum 10. The driving side flange 24 and the non-driving side flange 28 are fixed to the photosensitive drum 10, by means of calking or bonding, and are coaxially with the photosensitive drum 10. The drum bearing 30 is fixed to the driving side end portion 10a and the drum shaft 54 is fixed to the non-driving side end portion 10b, by means of screws, bonding, or press fitting, at both end portions of the cleaning frame body 21 in the longitudinal direction. The driving side flange 24 integrally fixed to the photosensitive drum 10 is rotatably supported by the drum bearing 30. Further, the non-driving side flange 28 is rotatably supported by the drum shaft 54.

Further, a charging roller gear 69 is provided at one end of the charging roller 11 in the longitudinal direction. The charging roller gear 69 is in mesh with a gear portion 24c of the driving side flange 24. Although not illustrated, the rotational force can be transmitted from the apparatus body A1 to a driving side end portion 24a of the drum flange 24. As a result, when the photosensitive drum 10 is driven to rotate around a rotational axis thereof, the charging roller 11 is driven to rotate around the rotational axis thereof. As mentioned above, the circumferential speed of the surface of the charging roller 11 is set to be approximately 105% to 120% of the circumferential speed of the surface of the photosensitive drum 10.

(Installation of Developing Cartridge B1 and Drum Cartridge C to Main Body Apparatus A1)

Figure 11A:
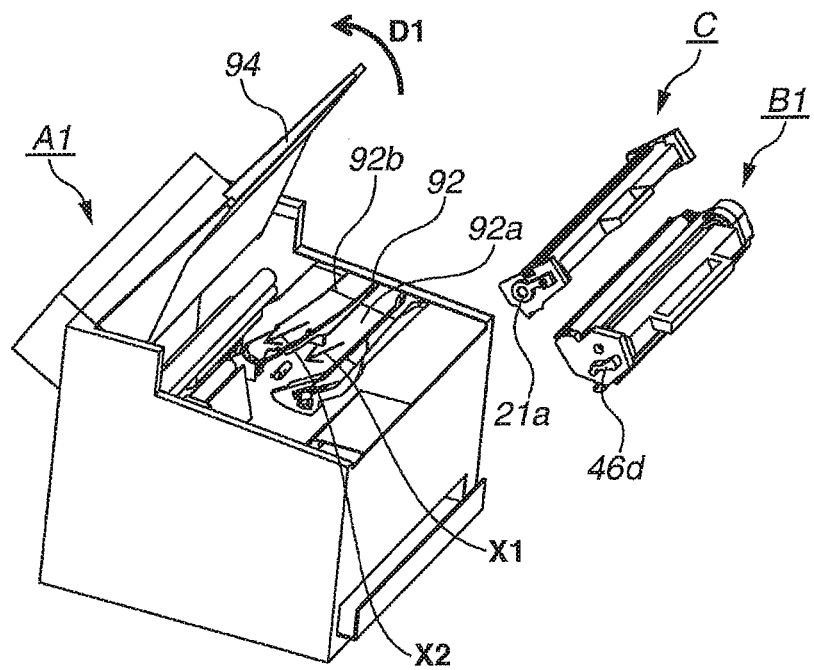
FIGS. 11A and 11B illustrate the drum cartridge and the developing cartridge in relation to an apparatus body.
Figure 11B:
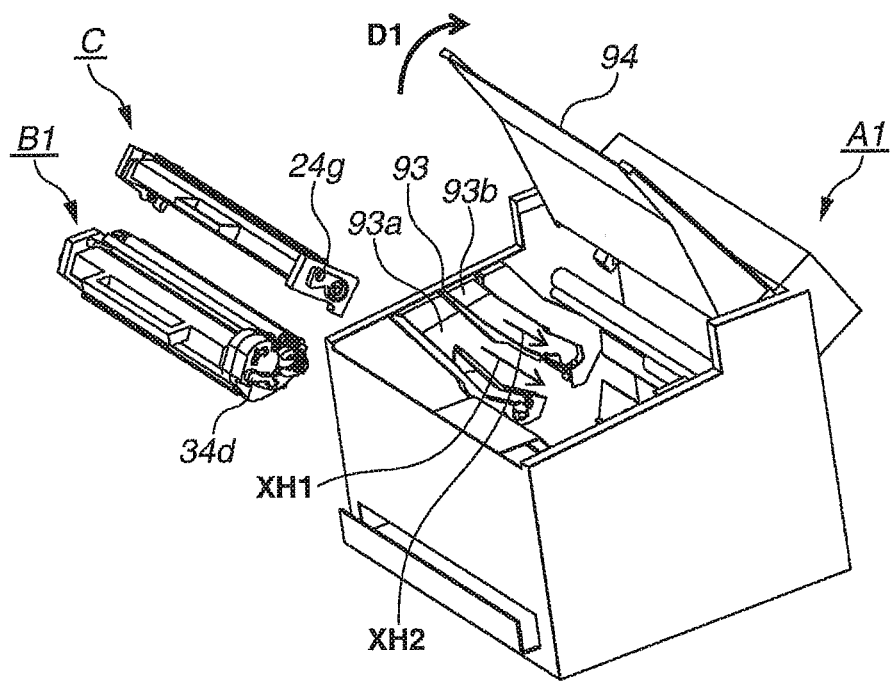

Next, a method for installing the developing cartridge B1 and the drum cartridge C to the apparatus body A1 will be described in detail below with reference to FIGS. 11A and 11B, which illustrate a process of attaching and detaching the developing cartridge B1 and the drum cartridge C to and from the apparatus body A1. FIG. 11A is a perspective view illustrating the developing cartridge B1 and the drum cartridge C, which are seen from the non-driving side thereof. FIG. 11B is a perspective view illustrating the developing cartridge B1 and the drum cartridge C, which are seen from the driving side thereof.

As illustrated in FIGS. 11A and 11B, the apparatus body A1 can be opened by rotating a main body cover 94 disposed at an upper part of the apparatus body A1 in an opening direction D1.

Subsequently, a guided portion 46d (see FIG. 11A) of the non-driving side bearing 46 of the developing cartridge B1 is engaged with a first guide portion 93a (see FIG. 11B) of the non-driving side guide member 93 of the apparatus body A1. Then, a guided portion 34d (see FIG. 11B) of the developing side cover 34 of the developing cartridge B1 is engaged with a first guide portion 92a of the driving side guide member 92 (see FIG. 11A) of the apparatus body A1. Thus, the developing cartridge B1 is inserted into the apparatus body A1 along attachment/detachment paths X1 and XH1 formed by the first guide portion 92a of the driving side guide member 92 and the first guide portion 93a of the non-driving side guide member 93.

Similarly, a non-driving side guide portion 21a (see FIG. 11A) of the cleaning frame body 21 of the drum cartridge C is engaged with a second guide portion 93b (see FIG. 11B) of the non-driving side guide member 93 of the apparatus body A1. Then, a driving side guide portion 24g (see FIG. 11B) of the driving side flange 24 of the drum cartridge C is engaged with a second guide portion 92b (see FIG. 11A) of the driving side guide member 92 of the apparatus body A1. Thus, the drum cartridge C is inserted into the apparatus body A1 along attachment/detachment paths X2 and XH2 formed by the second guide portion 92b of the driving side guide member 92 and the second guide portion 93b of the non-driving side guide member 93.

An operation for installing the cartridge B1 on the apparatus body A1, accompanied by inclination (or tilt) of the coupling member 180, will be described in detail below with reference to FIG. 12.

FIG. 12 illustrates a process of attaching and detaching the developing cartridge B1 to and from the apparatus body A1, while causing the coupling member 180 to incline (or tilt). FIGS. 12A1 to 12A4 are enlarged views respectively illustrating the vicinity of the coupling member 180, which are seen from the driving side thereof. FIGS. 12B1 to 12B4 are schematic views of FIG. 12A1 to 12A4, which are seen from a lower surface perpendicular to a direction indicated by an arrow X1. The installation operation progresses successively as illustrated in FIGS. 12A1 through 12A4. FIG. 12A4 illustrates an installation completion state. In FIG. 12, the driving side guide member 92 and the main body side driving member 100 belong to the apparatus body A1. Other constituent components belong to the developing cartridge B1.

As illustrated in FIGS. 12A1, 12B1, 12A2, and 12B2, the installation operation includes inserting the developing cartridge B1 into the apparatus body A1 in the direction X1 along the driving side guide member 92. The direction X1 is a predetermined direction substantially perpendicular to the rotation axis L1 of the main body side driving member 100.

In this case, the coupling member 180 is held in a state where the free end portion 180a is directed in a direction approaching the main body side driving member 100, by the coupling spring 185, which serving as an urging member (i.e., an elastic member), provided on the developing cartridge B1. While keeping this state, the developing cartridge B1 is inserted into the apparatus body A1. In the present exemplary embodiment, the axial line L3 represents the rotation axis of the drive input gear 27, the axial line L2 represents the rotation axis of the coupling member 180, and the axial line L1 represents the rotation axis of the main body side driving member 100. In the above-mentioned state, the axial line L2 is inclined relative to the axial line L3 and the axial line L1.

If the developing cartridge B1 is further inserted in the direction X1, the coupling member 180 is brought into contact with the main body side driving member 100, as illustrated in FIGS. 12A3 and 12B3. According to the illustrated example, a flat surface portion 180a1 provided at the free end portion 180a of the coupling member 180 is in contact with the rotational force applying portion 100a1 of the main body side driving member 100. The above-mentioned contact state regulates the position of the coupling member 180. The inclination (tilt) amount of the axial line L2 relative to the axial line L1 (or the axial line L3) gradually decreases.

When the developing cartridge B1 is fully inserted until it reaches an installation completion position, the axial line L2 and the axial line L1 (the axial line L3) are positioned on substantially the same straight line, as illustrated in FIGS. 12A4 and 12B4.

When the coupling member 180 is engaged with the main body side driving member 100 as mentioned above, transmitting the rotational force becomes feasible.

When the developing cartridge B1 is removed from the apparatus body A1, the removal operation progresses oppositely from the states illustrated in FIGS. 12A4 and 12B4 to the states illustrated in FIGS. 12A1 and 12B1. When the coupling member 180 inclines (tilts) from the axial line L3, the coupling member 180 can be disengaged from the main body side driving member 100. More specifically, when the developing cartridge B1 moves in a direction X3 that is opposite to the direction X1, the coupling member 180 can be disengaged from the main body side driving member 100. The direction X3 is a predetermined direction substantially perpendicular to the rotation axis L1 of the main body side driving member 100.

In the present exemplary embodiment, the coupling spring 185 causes the free end portion 180a of the coupling member 180 to face the direction approaching the main body side driving member 100 when the developing cartridge B1 is installed to or removed from the main body A1. Although it depends on a relationship between the installation direction X1 and the gravity direction or the weight of the coupling member 180, it may be feasible to cause the free end portion 180a of the coupling member 180 to face the direction X1 without relying on the coupling spring 185. In this case, the coupling spring 185 is unnecessary.

It is required that the developing cartridge B1 moves in the direction X1 or the direction X3 only when the developing cartridge B1 is in the vicinity of the installation completion position. In other words, the developing cartridge B1 can move in any direction if the developing cartridge B1 is far from the installation completion position. In short, it is required to move in the predetermined direction substantially perpendicular to the rotation axis L1 of the main body side driving member 100 only at engagement completion or disengagement start timing of the coupling member 180.

(Configuration of Coupling Member)

The coupling member 180 will be described in detail below with reference to the attached drawings.

Figure 13A:
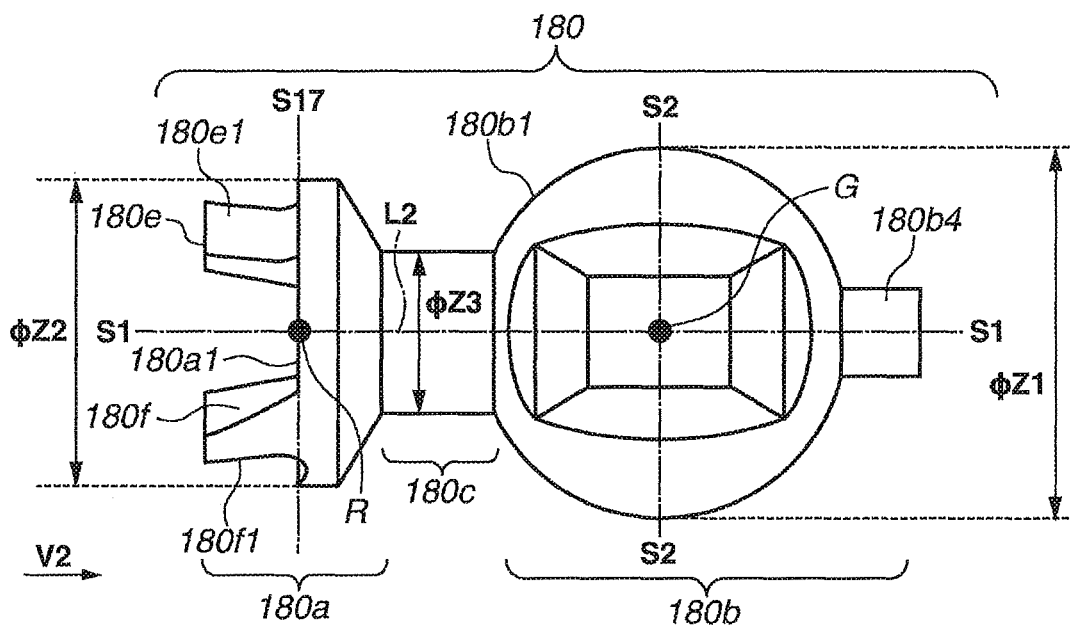
FIGS. 13A and 13B illustrate the coupling member.
Figure 13B:
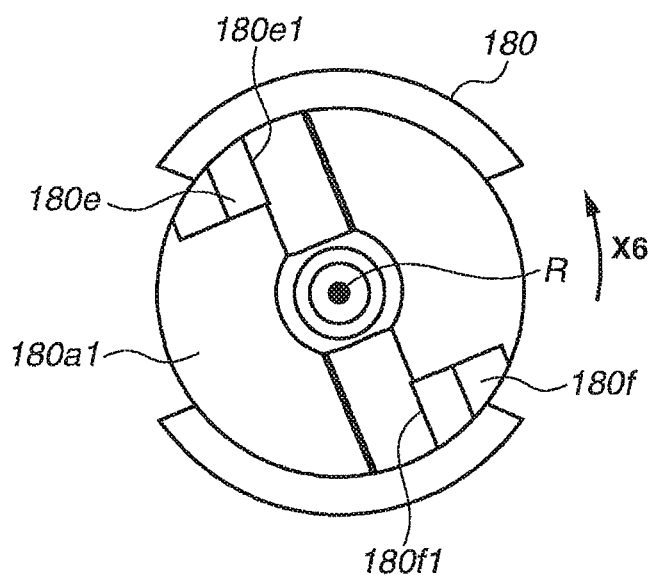
Figure 14A:
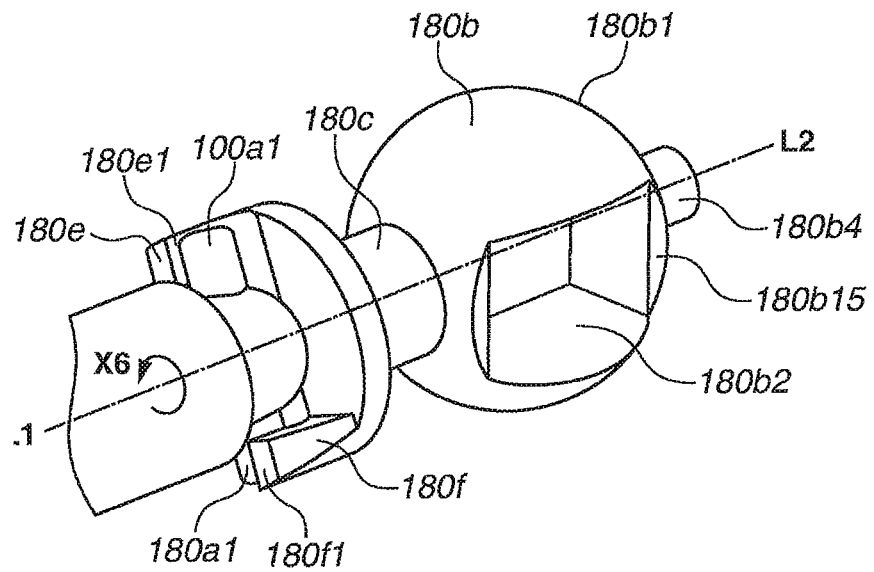
FIGS. 14A and 14B are perspective views illustrating the coupling member engaged with the main body side driving member.
Figure 14B:
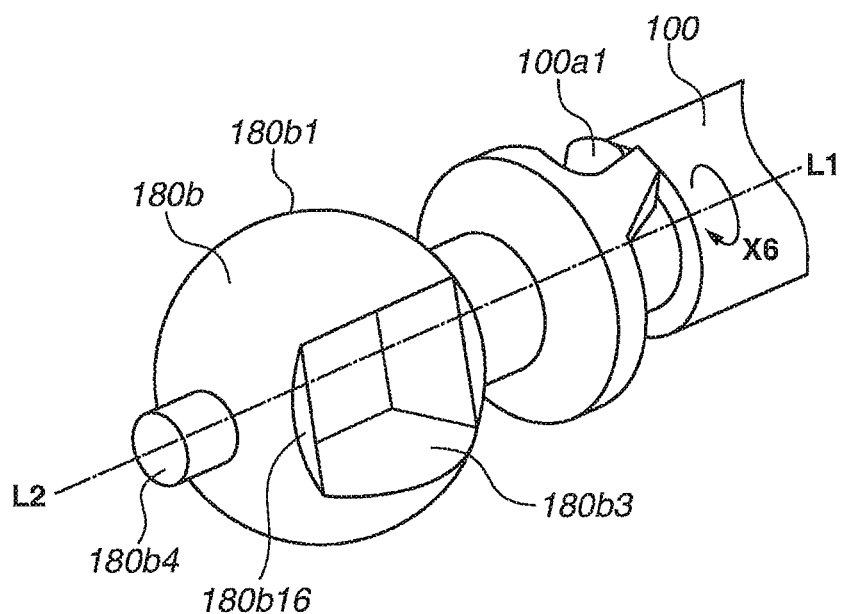

FIGS. 13A and 13B illustrate the coupling member 180. FIG. 13A is a side view illustrating the coupling member 180. FIG. 13B illustrates the coupling member 180 seen from a direction V2 illustrated in FIG. 13A. FIGS. 14A and 14B are perspective views illustrating the coupling member 180 engaged with the main body side driving member 100.

Figure 15:
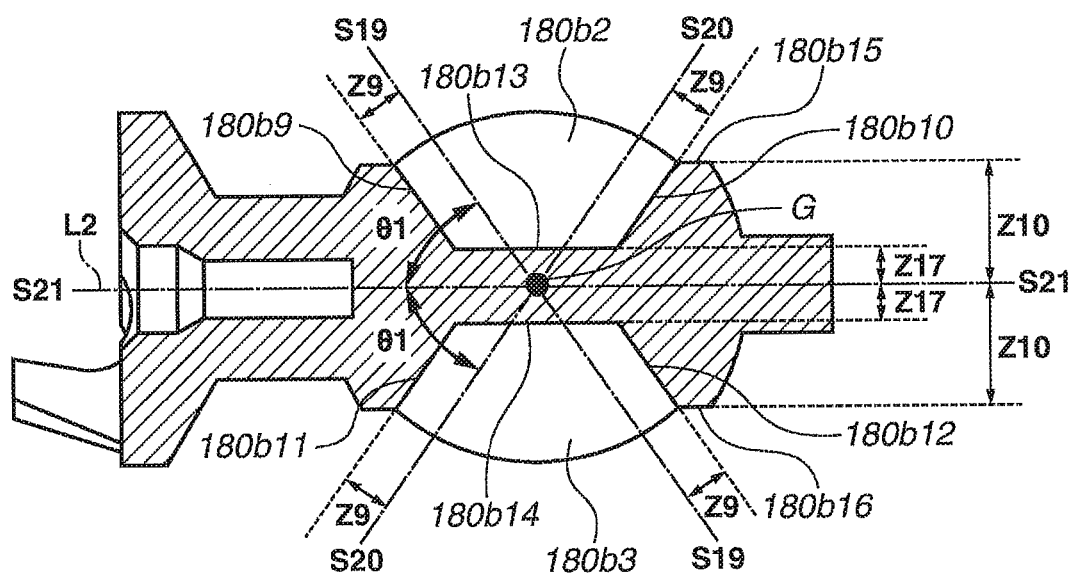
FIG. 15 is a cross-sectional view illustrating the coupling member.
Figure 16:
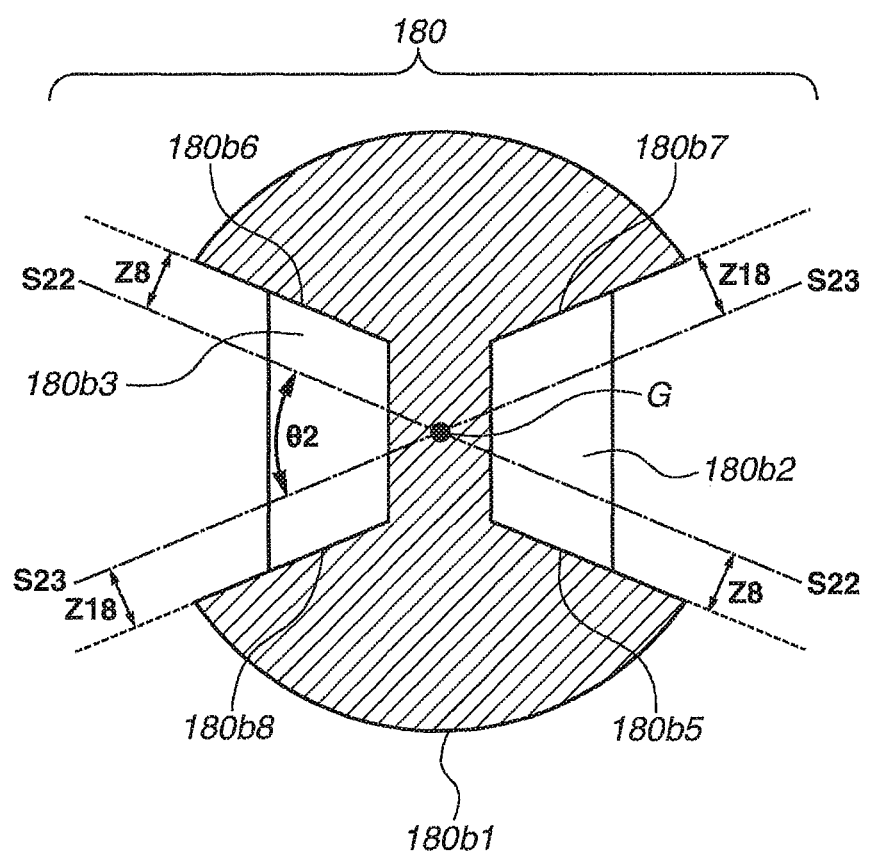
FIG. 16 is a cross-sectional view illustrating the coupling member.

FIG. 14A is a perspective view illustrating the engaged state seen from a viewpoint positioned adjacent to the main body side driving member 100. FIG. 14B is a perspective view illustrating the engaged state seen from a viewpoint positioned adjacent to the coupling member 180. FIG. 15 is a cross-sectional view illustrating the coupling member 180, which is taken along a cutting plane line S1-S1 that includes the axial line L2 illustrated in FIG. 13A. Further, a hatching portion represents a cross section in not only FIG. 15 but also in other cross-sectional views. FIG. 16 is a cross-sectional view illustrating the coupling member 180, which is taken along a cutting plane line S2-S2 that is perpendicular to the axial line L2 illustrated in FIG. 13A and passes through a center G of the spherical shape 180b1.

As illustrated in FIGS. 13A, 13B, 14A, and 14B, the coupling member 180 mainly includes three portions.

A first portion of the coupling member 180 is the free end portion 180a that engages with the main body side driving member 100 and receives the rotational force from the main body side driving member 100. The free end portion 180a includes two protrusions 180e and 180f provided at the distal end portion thereof, along a circle having a center positioned on the rotation axis L2 of the coupling member 180. The protrusions 180e and 180f are disposed point-symmetrically about a point R where the axial line L2 intersects with a flat surface S17 that includes the flat surface portion 180a1. When the main body side driving member 100 is rotating, the rotational force receiving portions 180e1 and 180f1 provided on the upstream side of the protrusions 180e and 180f in the rotation direction contact the rotational force applying portions 100a1 and 100a2 of the main body side driving member 100. Therefore, the rotational force can be transmitted in the rotational direction X6.

A second portion of the coupling member 180 is the connected portion 180b that has a substantially spherical shape. The connected portion 180b is connected (linked) to the drive input gear 27, which is a rotational force transmitted member (i.e., the transmitted member).

A third portion of the coupling member 180 is the linking portion 180c that connects the free end portion 180a to the connected portion 180b.

The connected portion 180b will be described in detail below with reference to the attached drawings.

As illustrated in FIGS. 13A, 13B, 14A, and 14B, the connected portion 180b is constituted by the spherical shape 180b1 having the center G (i.e., the inclination center) substantially positioned on the axial line L2, the recessed portions 180b2 and 180b3, and the inclination regulating portion 180b4.

In the present exemplary embodiment, a maximum rotation diameter φZ1 of the connected portion 180b is set to be greater than a maximum rotation diameter φZ2 of the free end portion 180a. Further, a diameter φZ3 of the linking portion 180c, which connects the connected portion 180b to the free end portion 180a, is smaller than the maximum rotation diameters φZ1 and φZ2.

When the coupling member 180 is seen from the rotation axis direction of the coupling member 180 (namely, when the coupling member 180 is seen from the left side along the direction of arrow V2 in FIG. 13), the outer shape of the free end portion 180a is greater than the outer shape of the linking portion 180c (i.e., φZ2>φZ3). On the other hand, the outer shape of the connected portion 180b is greater than the outer shape of the free end portion 180a (i.e., φZ2<φZ1).

The recessed portions 180b2 and 180b3 include driving force transmission surfaces 180b6 and 180b5 that are in contact with the protruded portions 27b2 and 27b3 (see FIG. 1) provided on the drive input gear 27 and transmit the driving force. Further, the recessed portions 180b2 and 180b3 include reverse rotation regulating surfaces 180b8 and 180b7 that can regulate a rotation amount in a direction opposite to the driving force transmission direction (see FIGS. 1A, 1B, and 1C and FIG. 16). Further, as illustrated in FIG. 15, the recessed portions 180b2 and 180b3 include noncontact side surfaces 180b9, 180b10, 180b11, and 180b12 and noncontact bottom surfaces 180b13 and 180b14. Further, as illustrated in FIGS. 14A, 14B, and 15, the recessed portions 180b2 and 180b3 include protruded portion confronting surfaces 180b15 and 180b16. As illustrated in FIGS. 13A, 13B, 14A, and 14B, the inclination regulating portion 180b4 has a cylindrical shape and is positioned at a side opposite to the free end portion 180a of the spherical shape 180b1. The inclination regulating portion 180b4 is coaxial with the axial line L2.

The noncontact side surfaces 180b9, 180b10, 180b11, and 180b12 are parallel to flat surfaces S19 and S20 that pass through the center G and incline from the axial line L2 by an angle Θ1, as illustrated in FIG. 15. Further, the noncontact side surfaces 180b9, 180b10, 180b11, and 180b12 are spaced from the flat surfaces S19 and S20 by the same distance (Z9). Further, as illustrated in FIG. 15, the noncontact bottom surfaces 180b13 and 180b14 are parallel to a flat surface S21 that includes the axial line L2 and passes through the center G. The noncontact bottom surfaces 180b13 and 180b14 are spaced from the flat surface S21 by the same distance (Z17). Further, as illustrated in FIG. 15, the protruded portion confronting surfaces 180b15 and 180b16 are parallel to the flat surface S21 and spaced from the flat surface S21 by the same distance (Z10).

Further, as illustrated in FIG. 16, the driving force transmission surfaces 180b6 and 180b5 are parallel to a flat surface S22, which passes through the center G of the spherical shape 180b1 and includes the axial line L2, and are spaced from the flat surface S22 by the same distance (Z8). Further, the reverse rotation regulating surfaces 180b8 and 180b7 according to the present exemplary embodiment are parallel to a flat surface S23, which inclines from the flat surface S22 by an angle Θ2, around the rotation axis L2, and are spaced from the flat surface S23 by the same distance (Z18).

The coupling member 180 according to the present exemplary embodiment is made of polyacetal, polycarbonate, PPS, or liquid crystal polymer resin. To improve the rigidity of the coupling member 180, it is useful to add glass fibers or carbon fibers to the above-mentioned resin considering the load torque. When the above-mentioned material is contained, the rigidity of the coupling member 180 can be improved appropriately. Further, the resin can contain metal inserts to improve the rigidity. It is also useful to manufacture the coupling member 180 as a metal member.

Further, the free end portion 180a, the connected portion 180b, and the linking portion 180c can be integrally formed. Alternatively, these members can be formed separately and integrally connected later.

(Relationship between Coupling Member 180 and Drive Input Gear 27)

A relationship between the coupling member 180 and the drive input gear 27 will be described in detail below with reference to the attached drawings.

Figure 17A:
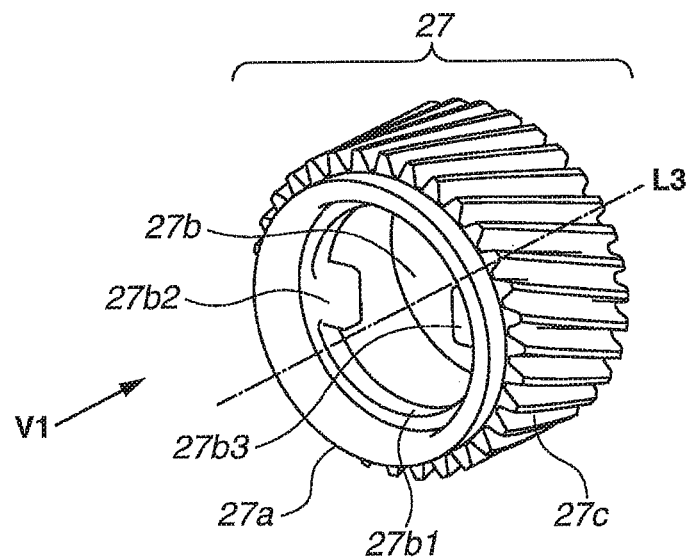
FIGS. 17A and 17B are perspective views illustrating the drive input gear.
Figure 17B:
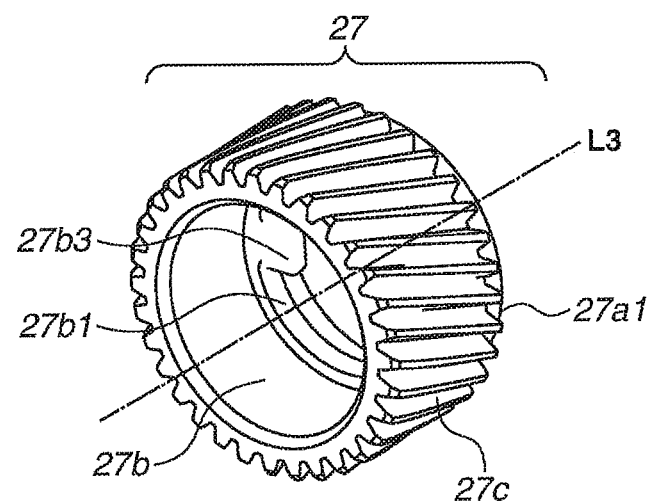
Figure 18:
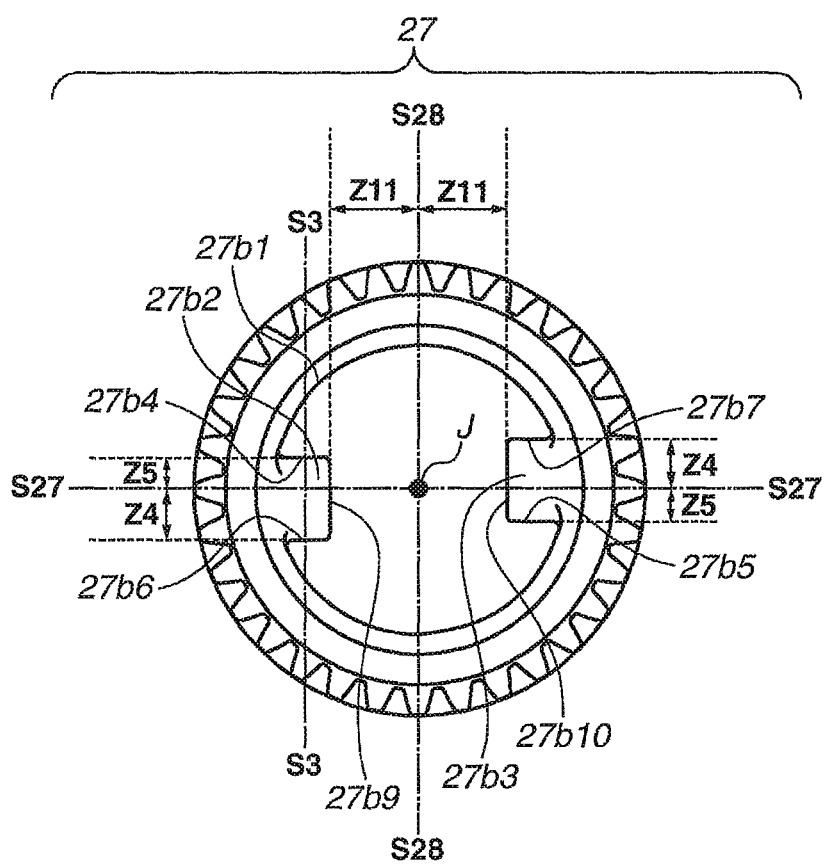
FIG. 18 is a side view illustrating the drive input gear.
Figure 19:
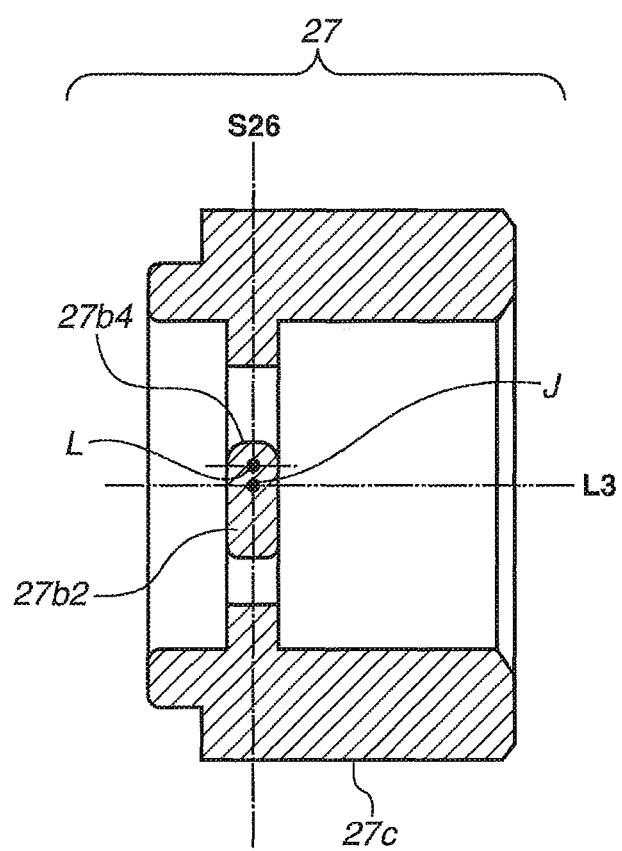
FIG. 19 is a cross-sectional view illustrating the drive input gear.
Figure 20A:
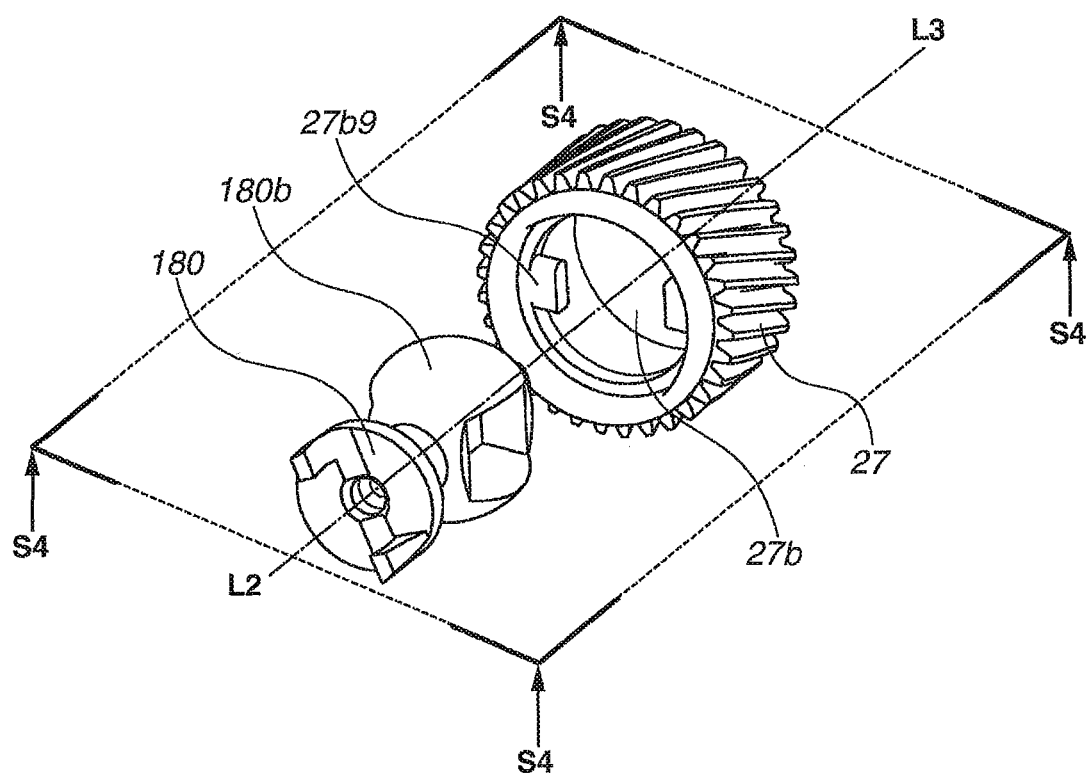
FIGS. 20A and 20B illustrate the coupling member and the drive input gear, which are separated from each other in a direction parallel to axial lines L2 and L3, in a state where the axial line L2 substantially coincides with the axial line L3.
Figure 20B:
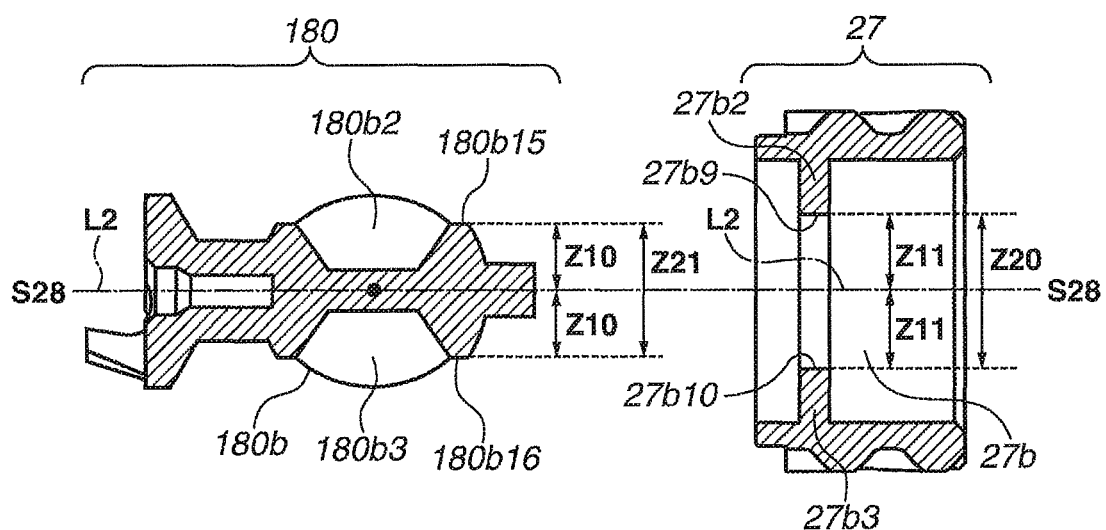

FIGS. 17A and 17B are perspective views respectively illustrating the drive input gear 27. FIG. 17A illustrates the drive input gear 27 seen from a viewpoint positioned adjacent to the driving side end face 27a. FIG. 17B illustrates the drive input gear 27 seen from a viewpoint positioned adjacent to another end surface that is opposite to the driving side end face 27a. FIG. 18 illustrates the drive input gear 27 seen from a direction indicated by an arrow V1 in FIG. 17A. FIG. 19 is a cross-sectional view illustrating the drive input gear 27, which is taken along a cutting plane line S3-S3. The cutting plane line S3-S3 is perpendicular to the projected shape of a driving force receiving surface 27b4 illustrated in FIG. 18. FIGS. 20A and 20B illustrate the coupling member 180 and the drive input gear 27, which are spaced away from each other along the axial lines L2 and L3, in a state where the axial line L2 substantially coincides with the axial line L3. FIG. 20A is a perspective view and FIG. 20B is a cross-sectional view taken along a flat surface S4 illustrated in FIG. 20A.

The drive input gear 27 will be described in detail below with reference to FIGS. 17A, 17B, 18, and 19. The drive input gear 27 has a cylindrical shape and includes the gear portion (e.g., a helical gear or a spur gear) 27c that can transmit a driving force to the developing roller gear 29, and the accommodating portion 27b provided at an internal portion thereof. The accommodating portion 27b has an inner space that can accommodate the connected portion 180b of the coupling member 180. The accommodating portion 27b includes an engaging portion 27b1 that protrudes from an inner wall thereof and engage with the spherical shape 180b1 of the coupling member 180. The accommodating portion 27b further includes the protruded portions 27b2 and 27b3 that protrude from the engaging portion 27b1. The protruded portions 27b2 and 27b3 include the driving force receiving surfaces 27b4 and 27b5 that can receive the driving force from the driving force transmission surfaces 180b6 and 180b5 of the coupling member 180. The driving force receiving surface 27b4 (and the driving force receiving surface 27b5) according to the present exemplary embodiment has a semicircular shape having a center L as illustrated in FIG. 19. Further, as illustrated in FIGS. 17A, 17B, and 18, the projected shapes of the driving force receiving surfaces 27b4 and 27b5 are point-symmetrical about a point J where a flat surface S26 (see FIG. 19) intersects with the rotation axis L3, when seen from the direction V1. The flat surface S26 is perpendicular to the rotation axis L3 and passes through the center L of the driving force transmission surface 27b4. Further, as illustrated in FIG. 18, the projected shapes of the driving force receiving surfaces 27b4 and 27b5 of the drive input gear 27 seen from the direction V1 are parallel to each other and spaced from a flat surface S27 by the same distance (Z5). The flat surface S27 is perpendicular to the flat surface S26 and passes through the point J. Further, as illustrated in FIG. 18, reverse rotation contact surfaces 27b6 and 27b7 provided on the protruded portions 27b1 and 27b2 are formed point-symmetrically about the point J, flat and parallel to the flat surface S27. The reverse rotation contact surfaces 27b6 and 27b7 are spaced from the flat surface S27 by the same distance (Z4=Z4).

Next, the relationship between the coupling member 180 and the drive input gear 27 will be described in detail below with reference to the attached drawings. As illustrated in FIGS. 18, 20A, and 20B, the drive input gear 27 includes recessed portion confronting surfaces 27b9 and 27b10. The recessed portion confronting surfaces 27b9 and 27b10 are flat surfaces parallel to a flat surface S28 that is perpendicular to the flat surface S27 and passes through the point J. The recessed portion confronting surfaces 27b9 and 27b10 are spaced from the flat surface S28 by the same distance (Z11). As illustrated in FIGS. 20A and 20B, the connected portion 180b of the coupling member 180 can be assembled with the accommodating portion 27b of the drive input gear 27, while keeping a positional relationship that the protruded portion confronting surfaces 180b15 and 180b16 are opposed to and parallel to the recessed portion confronting surfaces 27b9 and 27b10. In the above-mentioned configuration, in consideration of the easiness of assembling, the clearance (Z10+Z10=Z21) between the protruded portion confronting surfaces 180b15 and 180b16 is set to be smaller than the clearance (Z11+Z11=Z20) between the recessed portion confronting surfaces 27b9 and 27b10, as illustrated in FIG. 20B.

Hereinafter, another configuration of the coupling member 182 that is employable in a case where the clearance Z21 between the protruded portion confronting surfaces 180b15 and 180b16 is greater than the clearance Z20 between the recessed portion confronting surfaces 27b9 and 27b10 will be described in detail below.

FIGS. 21A1 to 21A4 and FIGS. 21B1 to 21B4 illustrate a method for assembling the coupling member 182 with the drive input gear 27. FIGS. 21A1 to 21A4 are side views illustrating the coupling member 182 and the drive input gear 27. FIG. 21B1 is a cross-sectional view taken along a cutting plane line S29-S29 including the axial line L3 illustrated in FIG. 21A1. FIG. 21B2 is a cross-sectional view taken along a cutting plane line S30-S30 including the axial line L3 illustrated in FIG. 21A2. FIG. 21B3 is a cross-sectional view taken along a cutting plane line S31-S31 including the axial line L3 illustrated in FIG. 21A3. FIG. 21B4 is a cross-sectional view taken along a cutting plane line S32-S32 including the rotation axis L13 of the coupling member 182 and the axial line L3 illustrated in FIG. 21A4. The operation for assembling the coupling member 182 with the drive input gear 27 progresses in the order from FIG. 21A1 to FIG. 21A4.

In an initial stage of the assembling, the coupling member 182 and the drive input gear 27 are held in a positional relationship that the protruded portion confronting surfaces 182b15 and 182b16 confront the recessed portion confronting surfaces 27b9 and 27b10, as illustrated in FIGS. 21A1 and 21B1. The assembling of the coupling member 180 starts in a state where the axial line L2 inclines from the axial line L3 by an angle Θ6.

As illustrated in FIG. 21, the coupling member 182 is similar to the above-mentioned coupling member 180, except the recessed portion confronting surfaces 182b15 and 182b16. The recessed portion confronting surfaces 182b15 and 182b16 are flat surfaces parallel to the flat surface S21 that is parallel to the rotation axis L13 of the coupling member 182 and passes through the center G of the spherical shape 182b1, as illustrated in FIG. 21B4. The recessed portion confronting surfaces 182b15 and 182b16 are spaced from the flat surface S21 by the same distance (Z18). In the above-mentioned configuration, as illustrated in FIG. 21B4, the clearance (Z18+Z18=Z22) between the protruded portion confronting surfaces 182b15 and 182b16 is set to be greater than the clearance Z20 between the recessed portion confronting surfaces 27b9 and 27b10.

The method for assembling the coupling member 182 with the drive input gear 27 includes a preparatory step of holding a positional relationship that the protruded portion confronting surfaces 182b15 and 182b16 are parallel to and opposed to the recessed portion confronting surfaces 27b9 and 27b10, as illustrated in FIG. 21B1. Further, the assembling method includes a step of inclining the coupling member 182 from the rotation axis L3 of the drive input gear 27 by the angle Θ6. In this state, by causing the coupling member 182 to move in a direction indicated by an arrow X9 as illustrated in FIG. 21B2, the protruded portion confronting surface 182b15 can pass through the recessed portion confronting surface 27b9 of the drive input gear 27. The assembling method further includes a step of causing the coupling member 182 to move in a direction indicated by an arrow X10, which is parallel to a noncontact side surface 182b10, as illustrated in FIG. 21B3. Through the above-mentioned operation, the protruded portion confronting surface 180b16 can approach the axial line L3 closely rather than the recessed portion confronting surface 27b10. Therefore, the protruded portion confronting surface 180b16 can directly pass through the recessed portion confronting surface 27b10. The assembling method includes a final step of causing the coupling member 182 to enter the accommodating portion 27b of the drive input gear 27 in the direction X9, while holding a positional relationship that the rotation axis L13 of the coupling member 182 nearly coincides with the rotation axis L3 of the drive input gear 27, as illustrated in FIG. 21B4. Thus, the coupling member 182 and the drive input gear 27 can be connected to each other.

The above-mentioned configuration enables the protruded portions 27b2 and 27b3 of the drive input gear 27 to enter and engage with the recessed portions 180b2 and 180b3 of the coupling member 180, as illustrated in FIGS. 1A to 1C. As a result, the coupling member 180 and the drive input gear 27 can be integrated together.

Figure 22:
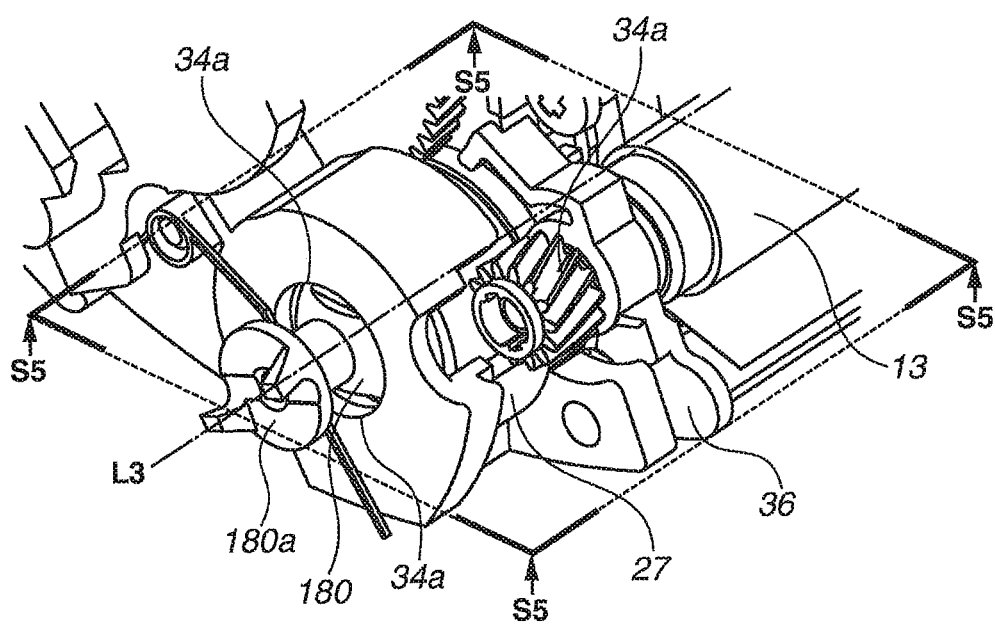
FIG. 22 is a perspective view illustrating the driving side of the developing cartridge.
Figure 23:
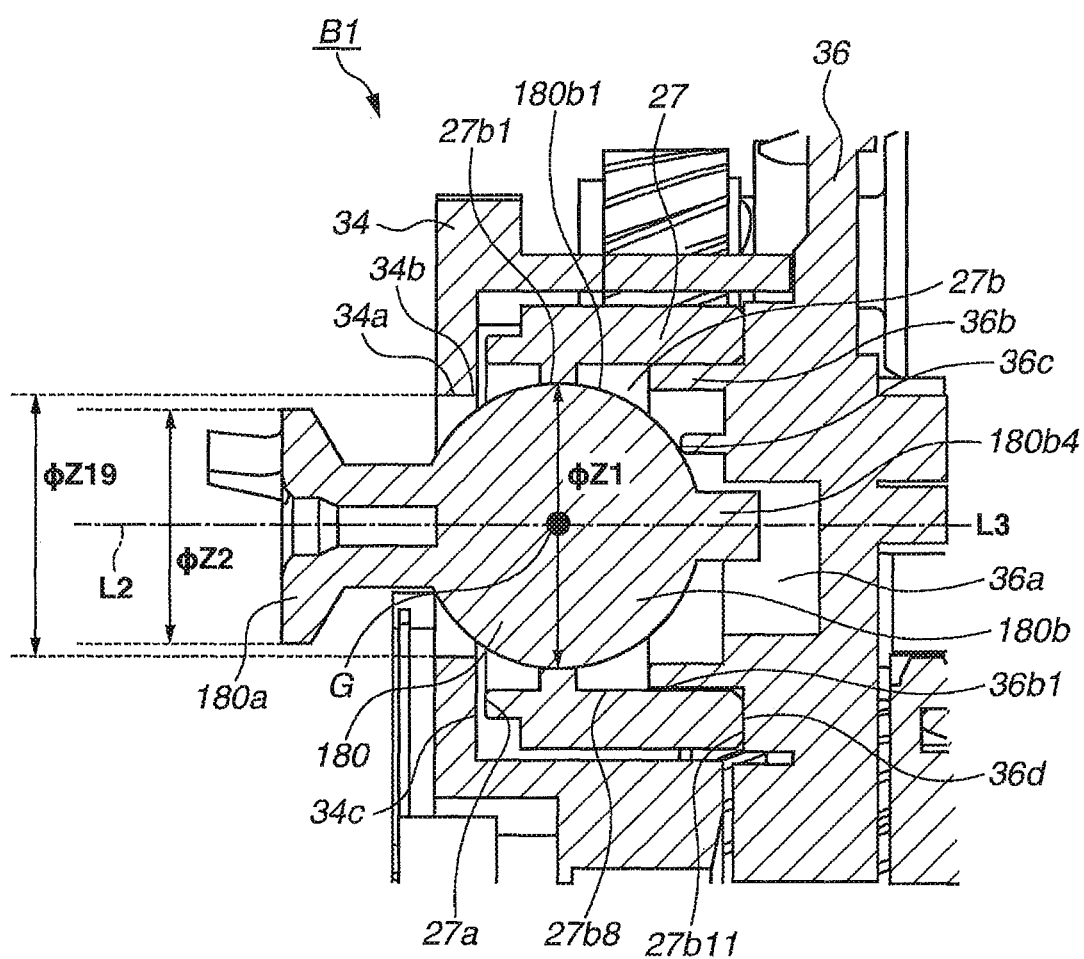
FIG. 23 is a cross-sectional view illustrating the driving side of the developing cartridge.
Figure 24:
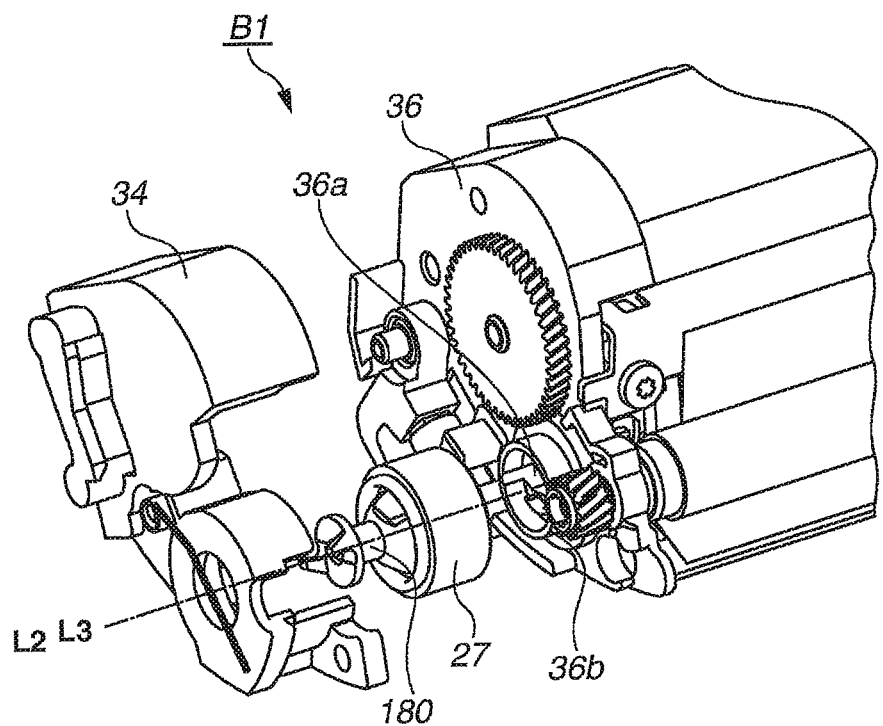
FIG. 24 is a perspective view illustrating the coupling member, the drive input gear, and a developing side cover, which are separated from each other in the direction L3 of the rotation axis of the drive input gear.

Next, a method for assembling the drive input gear 27, which is connected to the coupling member 180, with the developing cartridge B1 will be described in detail below with reference to the attached drawings. FIG. 22 is a perspective view illustrating the driving side of the developing cartridge B1. FIG. 23 is a cross-sectional view taken along a flat surface S5 that includes the rotation axis L3 of the drive input gear 27 illustrated in FIG. 22. FIG. 24 a perspective view illustrating the developing cartridge B1, in which the coupling member 180, the drive input gear 27, and the developing side cover 34 are spaced away from each other in a direction parallel to the rotation axis L3 of the drive input gear 27.

As illustrated in FIGS. 23 and 24, the drive input gear 27 is assembled with a cylindrical boss 36b provided on the driving side developing bearing 36. The drive input gear 27 can be rotatably assembled with the developing cartridge B1, by causing a sliding portion 27b8 provided on the accommodating portion 27b to engage with the gear support surface 36b1. In this case, as illustrated in FIGS. 23 and 24, the coupling member 180 is assembled in such a manner that the inclination regulating portion 180b4 is accommodated in the regulating accommodating portion 36a provided on the driving side developing bearing 36.

The developing side cover 34, which prevents the coupling member 180 and the drive input gear 27 from falling off, has the hole 34a provided to bare the free end portion 180a of the coupling member 180. A diameter φZ19 of the hole 34a is set to be greater than the maximum rotation diameter φZ2 of the free end portion 180a of the coupling member 180 and smaller than the maximum rotation diameter φZ1 of the connected portion 180b.

More specifically, it is now assumed that the coupling member 180 and the developing side cover 34 are seen from the rotation axis direction (i.e., the direction parallel to the rotation axes of the coupling member 180 and the drive input gear 27) (namely, seen along the rotation axis from the left side in FIG. 23). In this case, the outer shape of the connected portion 180b is greater than the outer shape of the free end portion 180a (i.e., φZ1>φZ2).

Further, the developing side cover 34 includes the hole (i.e., aperture) 34a that bares the coupling member 180. When the hole 34a is seen from the rotation axis direction, the outer shape of the hole 34a is greater than the outer shape of the free end portion 180a and is smaller than the outer shape of the connected portion (i.e., φZ2<φZ19<φZ1).

Figure 25:
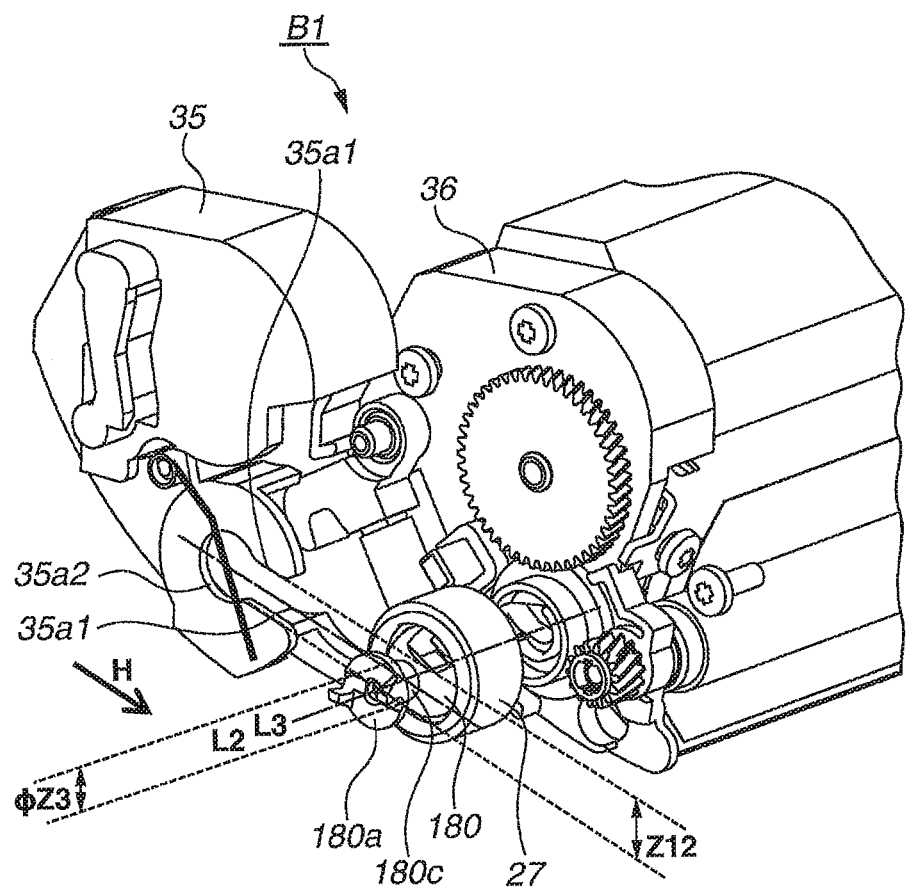
FIG. 25 is a perspective view illustrating the developing side cover and the developing cartridge in a pre-assembling state.
Figure 26:
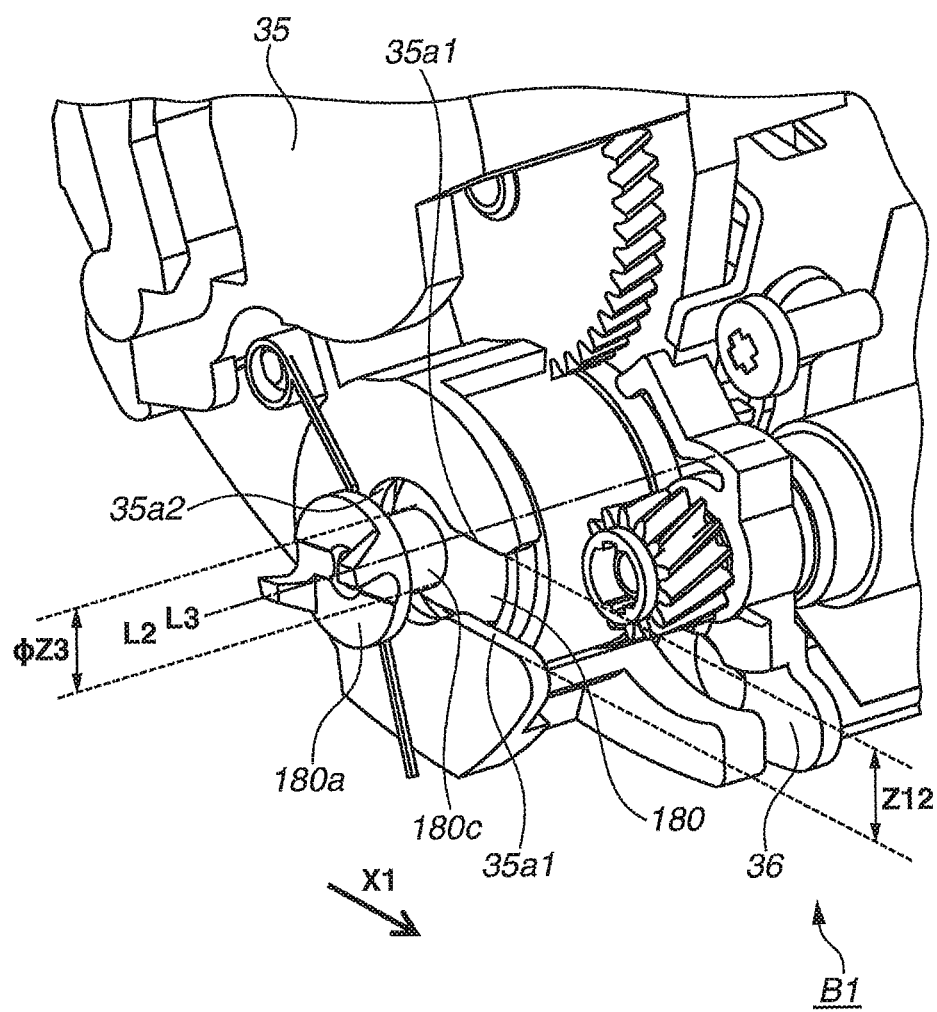
FIG. 26 is a perspective view illustrating the developing cartridge including the developing side cover.

Next, another developing side cover that is comparable to the above-mentioned developing side cover 34 and brings similar effects will be described in detail below with reference to the attached drawings. FIG. 25 is a perspective view illustrating a developing side cover 35 in a state where the developing side cover 35 is not yet assembled with the developing cartridge B1. FIG. 26 is a perspective view illustrating the developing cartridge B1 that includes the developing side cover 35.

As illustrated in FIGS. 25 and 26, the developing side cover 35 may include a partly opened portion 35a1 and a hole (i.e., an aperture) 35a2 to obtain similar effects. The hole 35a2 bares the free end portion 180a when the developing side cover 35 is assembled with the driving side developing bearing 36.

The size of the hole 35a2 is set to be smaller than the diameter of the spherical shape 180b1 (i.e., the connected portion 180b) of the coupling member 180 to prevent the coupling member 180 from moving toward the driving side.

More specifically, when the coupling member 180 is forced to move outward along the longitudinal direction of the developing roller (toward the free end side of the coupling member 180), the spherical shape 180b1 (the connected portion 180b) interferes (contacts) with the developing side cover 35 (i.e., the cover member). Therefore, the coupling member 180 can be prevented from moving outward. In this respect, the developing side cover 35 is a regulating member (a second regulating member) that prevents the coupling member 180 from moving toward the free end portion 180a.

Next, a dimension Z12 of the partly opened portion 35a1 is set to be greater than the outer diameter φZ3 of the linking portion 180c of the coupling member 180, as illustrated in FIG. 26. On the other hand, the dimension Z12 of the partly opened portion 35a1 is set to be smaller than the outer diameter (φZ1) of the connected portion 180b of the coupling member 180.

More specifically, when the developing side cover 35 is seen from the rotation axis direction of the coupling member 180, the outer shape of the partly opened portion 35a1 is greater than the outer shape of the linking portion 180c and is smaller than the outer shape of the connected portion 180b.

Thus, as illustrated in FIG. 25, it is feasible to slide the developing side cover 35 in a direction of arrow H so that the partly opened portion 35a1 can be coupled with the linking portion 180c of the coupling member 180. More specifically, the partly opened portion 35a1 permits the linking portion 180c to enter the hole 35a2.

Thus, irrespective of the outer shape size of the free end portion 180a of the coupling member 180, the developing side cover 35 can be assembled with the driving side developing bearing 36 in such a way as to prevent the coupling member 180 from falling off. In this case, to avoid any obstruction in the inclination operation of the coupling member 180, it is desired that the partly opened portion 35a1 of a U-shaped groove 35a is provided in an inclining direction of the coupling member 180, namely, in the installation direction X1 of the developing cartridge B1.

In the present exemplary embodiment, the drive input gear 27 is a resin-made component that can be formed by an appropriate injection molding method. The material of drive input gear 27 is, for example, polyacetal or polycarbonate. Alternatively, it may be useful that the drive input gear 27 is a metal-made component if a significant load torque is required to rotate the photosensitive drum 10.

A practical method for supporting respective constituent components will be described in detail below with reference to FIGS. 1A to 1C and FIG. 23.

The positioning of the coupling member 180 in the direction parallel to the rotation axis L3 of the drive input gear 27 is determined in such a manner that the coupling member 180 is sandwiched between a spherical receiving portion 36c provided on the driving side developing bearing 36 and the spherical retainer portion 34b provided adjacent to the hole 34a of the developing side cover 34. Further, the positioning of the coupling member 180 in a direction perpendicular to the axial line L3 completes when the spherical shape 180b1 is rotatably engaged with the engaging portion 27b1 of the drive input gear 27. The positioning of the drive input gear 27 in a direction parallel to the axial line L3 completes when a gear sliding surface 36d of the driving side developing bearing 36 collides with a bearing end surface 27b11 of the drive input gear 27 and a gear retainer surface 34c of the developing side cover 34 collides with the driving side end face 27a of the drive input gear 27. The positioning of the drive input gear 27 in a direction perpendicular to the axial line L3 completes when the sliding portion 27b8 is rotatably engaged with the gear support surface 36b1 provided on the driving side developing bearing 36.

As illustrated in FIG. 1B, when the coupling member 180 rotates in a rotational direction X11 around the axial line L2, the driving force transmission surfaces 180b6 and 180b5 provided on the recessed portions 180b2 and 180b3 are brought into contact with the driving force receiving surfaces 27b4 and 27b5 of the protruded portions 27b2 and 27b3. Therefore, the movement of the coupling member 180 can be regulated. Alternatively, the movement of the coupling member 180 can be regulated when the reverse rotation regulating surfaces 180b7 and 180b8 of the recessed portions 180b2 and 180b3 are brought into contact with the reverse rotation regulating surfaces 27b7 and 27b6 of the protruded portions 27b3 and 27b2. Therefore, the position of the coupling member 180 can be regulated within a predetermined range in the rotational direction X11 of the coupling member 180.

Further, in the driving posture state illustrated in FIGS. 1A and 1C, the rotation axis L2 of the coupling member 180 substantially coincides with the rotation axis L3 of the drive input gear 27. In this state, the noncontact side surfaces 180b9, 180b10, 180b11 and 180b12 and the noncontact bottom surfaces 180b13 and 180b14 do not contact with the protruded portions 27b2 and 27b3.

As mentioned above, the coupling member 180 can be assembled with the developing cartridge B1 so that the coupling member 180 can incline relative to the developing cartridge B1.

Further, as mentioned above, the accommodating portion 27b, the spherical retainer surface 34b, and the spherical receiving portion 36c cooperatively regulate the position of the connected portion 180b. Further, the position of the coupling member 180 can be regulated similarly even when the coupling member 180 is in the inclined state. Accordingly, when the coupling member 180 is inclined (tilted), the intersection of the axial line L2 and the axial line L3 substantially coincides with the center G. In other words, the center G is an inclination (tilt) center of the coupling member 180.

(Inclining (Tilting) Operation of Coupling Member 180)

An inclination (tilt) operation of the coupling member 180 will be described in detail below with reference to the attached drawings.

Figure 27A:
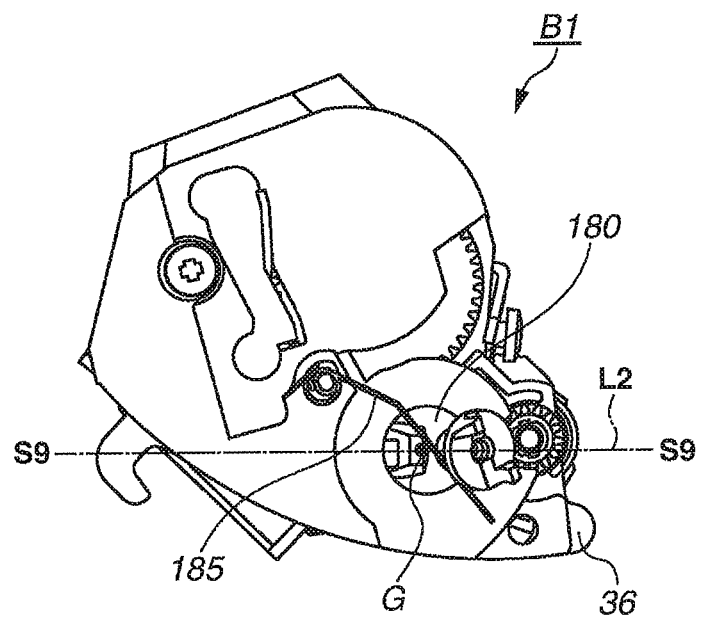
FIGS. 27A and 27B illustrate the developing cartridge in a state where the coupling member is inclined.
Figure 27B:
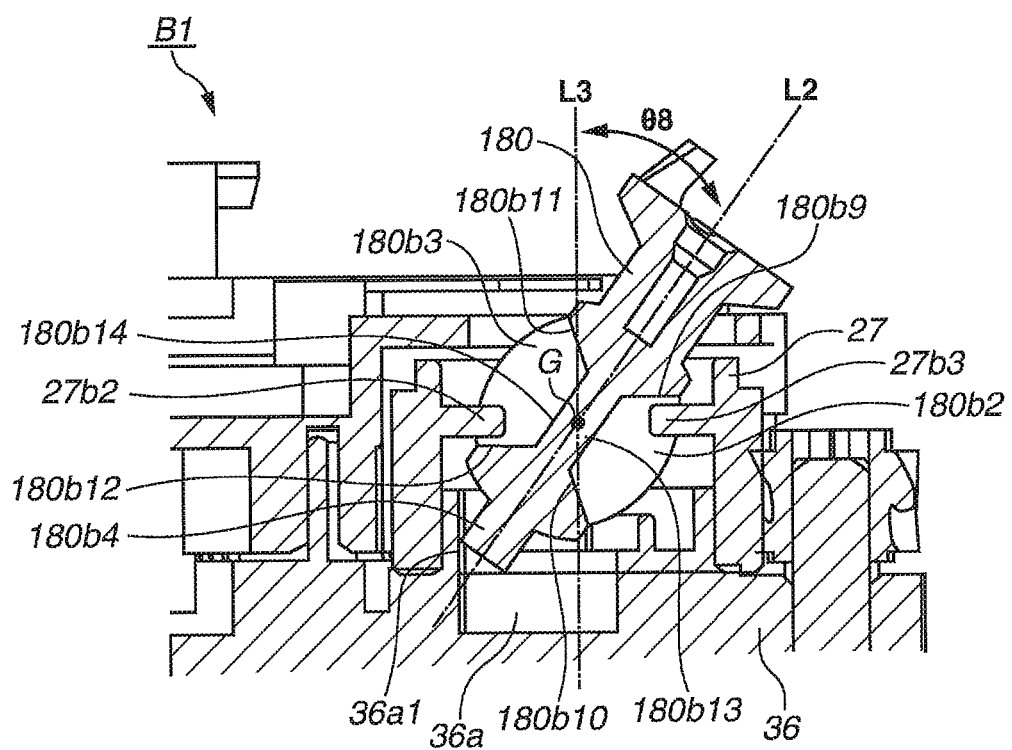

FIGS. 27A and 27B illustrate the developing cartridge B1 in a state where the coupling member 180 is inclined. FIG. 27A illustrates the driving side of the developing cartridge B1. FIG. 27B is a cross-sectional view taken along a flat surface S9, which includes the rotation axis L2 of the coupling member 180, illustrated in FIG. 27A.

As illustrated in FIGS. 27A and 27B, the coupling member 180 inclines around the center G by the function of the coupling spring 185. The inclination regulating portion 180b4 contacts a regulating portion 36a1 of the driving side developing bearing 36. Therefore, the coupling member 180 is in an inclined posture with an inclination angle $\Theta 8$. In this case, the noncontact side surfaces 180b9 and 180b12 of the coupling member 180 do not contact the protruded portions 27b3 and 27b2 of the drive input gear 27. Further, the recessed portions 180b2 and 180b3 of the coupling member 180 and the protruded portions 27b2 and 27b3 of the drive input gear 27 are constituted to hold the inclined posture relative to the inclination direction, by causing the inclination regulating portion 180b4 to contact the regulating portion 36a1 in any phase in the axial line L2 rotational direction.

Similarly, the noncontact side surfaces 180b10 and 180b11 of the coupling member 180 do not contact the protruded portions 27b3 and 27b2 of the drive input gear 27 when the coupling member 180 is in the inclined posture. No problem will occur even when the noncontact side surfaces 180b9, 180b10, 180b11, and 180b12 and the noncontact bottom surfaces 180b13 and 180b14 are modified from the shapes described in the present exemplary embodiment (see FIGS. 1A to 1C and FIGS. 27A and 27B). More specifically, it is essentially required that the noncontact side surfaces 180b9, 180b10, 180b11, and 180b12 and the noncontact bottom surfaces 180b13 and 180b14 do not contact the protruded portions 27b1 and 27b2 of the coupling member 180 in the driving posture and the inclined posture.

As mentioned above, the coupling member 180 can incline (tilt) from the rotation axis L3 of the driving force transmission member 27 with the predetermined inclination angle $\Theta 8$ in substantially all directions. More specifically, the coupling member 180 can incline (tilt) relative to the axial line L3 in any direction. Further, the coupling member 180 can swing relative to the axial line L3 in any direction. Further, the coupling member 180 can turn around the axial line L3 substantially in all directions. In the present exemplary embodiment, the turning of the coupling member 180 can be defined as a rotational motion of the inclined (tilted) axial line L2 around the axial line L3.

Another configuration capable of preventing the coupling member 182 from falling off, which is applicable in a case where the above-mentioned coupling member 182 is used, will be described in detail below.

Figure 28A:
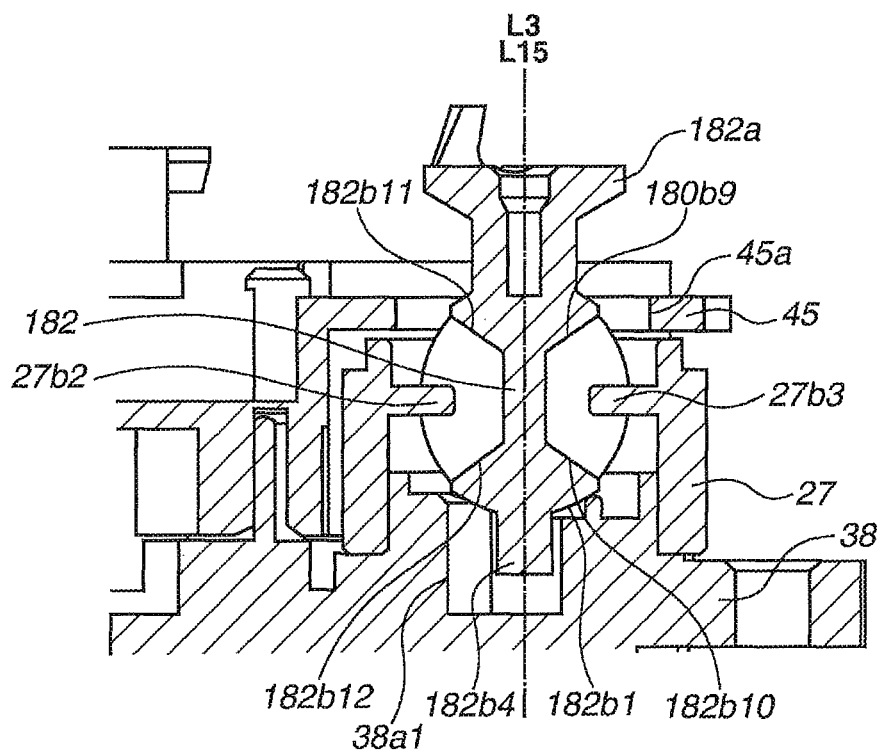
FIGS. 28A and 28B are cross-sectional views illustrating the coupling member, the drive input gear, and the developing side cover, which are assembled with a driving side developing bearing.
Figure 28B:
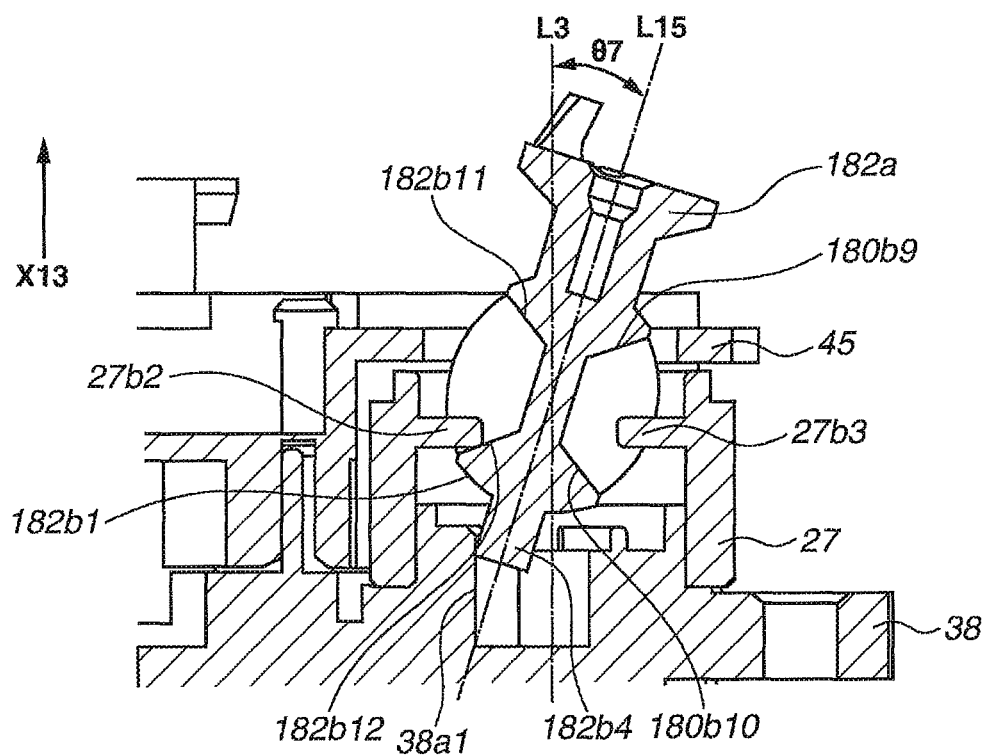

FIGS. 28A and 28B are cross-sectional views illustrating the coupling member 182, the drive input gear 27, and a developing side cover 45, which are assembled with a driving side developing bearing 38. FIG. 28A illustrates the coupling member 182 in the driving posture. FIG. 28B illustrates the coupling member 182 in the inclined posture, in which the coupling member 182 has been moved toward the driving side. As illustrated in FIG. 28B, a regulating portion 38a1 of the driving side developing bearing 38 is brought into contact with the inclination regulating portion 182b4 if the coupling member 182 is tilted. As a result, a rotation axis L15 of the coupling member 182 inclines from the axial line L3 by an angle Θ7. The angle Θ7 is set to be smaller than the angle Θ6 (Θ7<Θ6). The angle Θ6 is the angle having been described in the process of inserting the coupling member 182 in the drive input gear 27 with reference to FIG. 21. Thus, as illustrated in FIG. 28B, the protruded portion 27b2 of the drive input gear 27 collides with the coupling member 182b12. The coupling member 182 can be prevented from being disengaged from the developing input gear 27 in a direction X13. Thus, the size of a hole 45a that bares a free end portion 182a of the coupling member 182 provided on the developing side cover 45 can be set adequately irrespective of the outer diameter of the spherical shape 182b1 of the coupling member 182.

Further, a developing cartridge B2 including a coupling member 183 that can incline according to another method will be described in detail below.

Figure 29A:
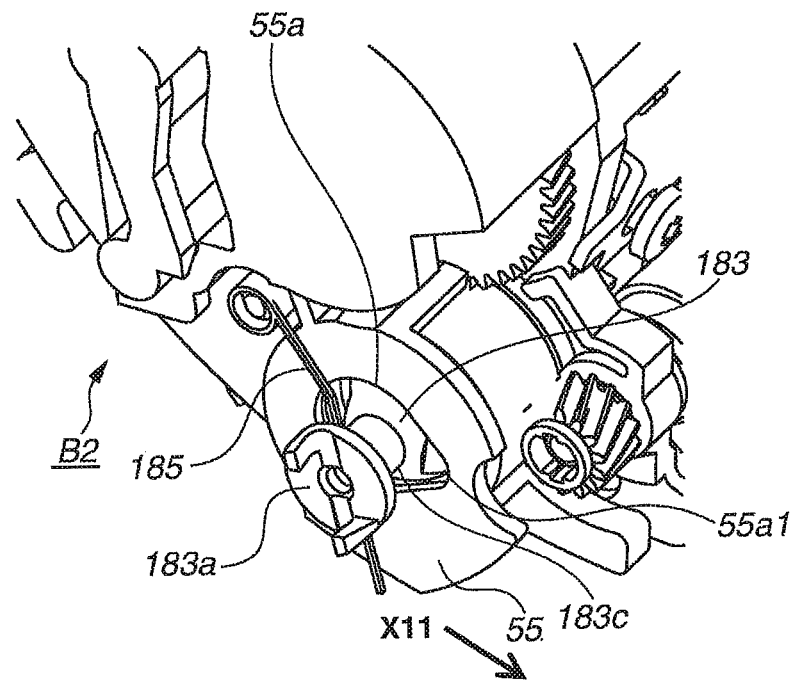
Figure 29B:
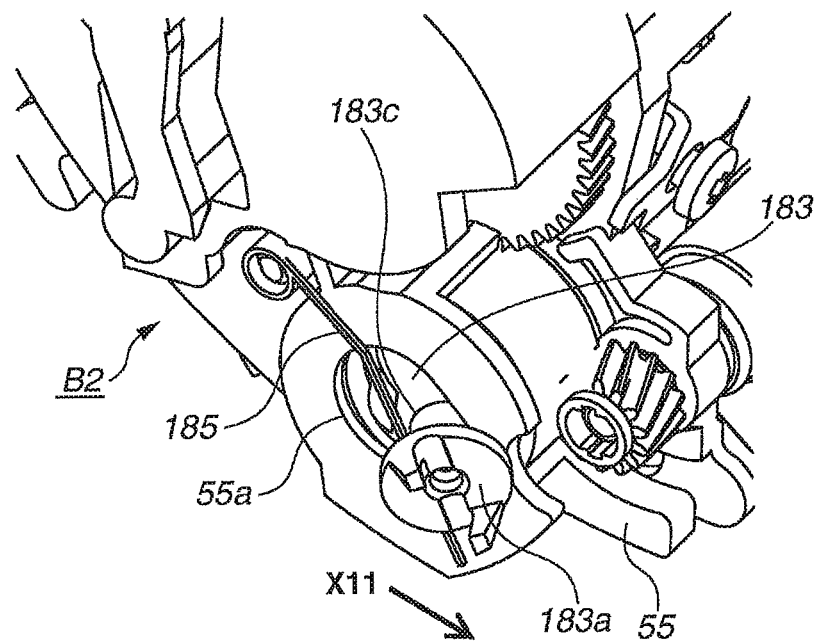
Figure 30A:
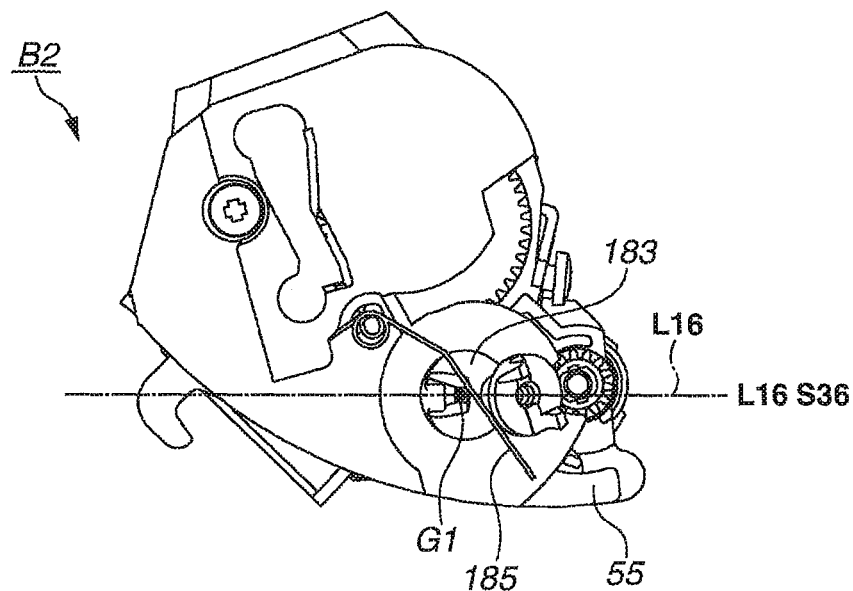
FIGS. 30A and 30B illustrate a coupling member of another developing cartridge in an inclined state.
Figure 30B:
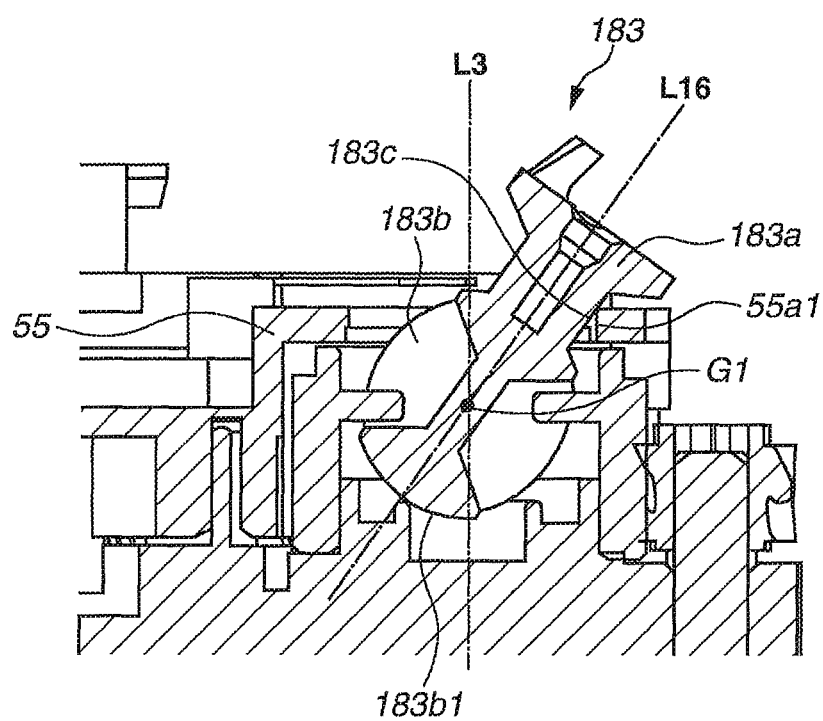

FIGS. 29A and 29B are perspective views illustrating the developing cartridge B2, which is seen from a driving side thereof. FIG. 29A illustrates the coupling member 183 in the driving posture, and FIG. 29B illustrates the coupling member 183 in the inclined posture. FIGS. 30A and 30B illustrate another configuration of the developing cartridge B2, in which the coupling member 183 is in the inclined posture. FIG. 30A is a side view illustrating the developing cartridge B2. FIG. 30B is a cross-sectional view taken along a flat surface S36 illustrated in FIG. 30A. The flat surface S36 includes a rotation axis L16 of the coupling member 183.

As illustrated in FIG. 30B, the coupling member 183 has a connected portion 183b that does not include a portion comparable to the inclination regulating portion 180b4 illustrated in FIGS. 13A and 13B. The coupling member 183 has a configuration similar to that of the above-mentioned coupling member 180 illustrated in FIGS. 13A and 13B, except for the shape of the inclination regulating portion 180b4.

As illustrated in FIG. 29A, a developing side cover 55 of the developing cartridge B2 includes a through-hole 55a through which a free end portion 183a of the coupling member 183 can move smoothly. Similar to the above-mentioned hole 34a of the developing side cover 34 illustrated in FIG. 23, the hole 55a is constituted in such a way as to prevent the coupling member 183 from falling off. The hole 55a includes an inclination regulating portion 55a1 that can be brought into contact with a linking portion 183c of the coupling member 183. In other words, the inclination regulating portion 55a1 can regulate the inclination amount of the coupling member 183 in an inclination direction X11. As illustrated in FIGS. 30A and 30B, the coupling spring 185 causes the coupling member 183 to incline about a center G1 of a spherical shape 183b1 so that the linking portion 183c contacts the inclination regulating portion 55a1. Thus, the coupling member 183 takes the inclined posture. It has been described with reference to FIGS. 27A and 27B that the noncontact surfaces 180b9, 180b10, 180b11, and 180b12 of the coupling member 180 do not contact the protruded portions 27b3 and 27b2 of the drive input gear 27. The configuration of the present exemplary embodiment illustrated in FIGS. 30A and 30B is characterized in that noncontact surfaces do not contact protruded portions. In this respect, the configuration of the present exemplary embodiment is similar to the above-mentioned configuration including the coupling member 180 and the drive input gear 27. Therefore, redundant description thereof will be avoided.

As mentioned above, the coupling member 183 can incline (tilt) from the rotation axis L3 of the driving force transmission member 27 with a predetermined inclination angle in substantially all directions. More specifically, the coupling member 183 can incline (tilt) relative to the axial line L3 in any direction. Further, the coupling member 183 can swing relative to the axial line L3 in any direction. Further, the coupling member 183 can turn around the axial line L3 in substantially all directions. In the present exemplary embodiment, the turning of the coupling member 183 can be defined as a rotational motion of the inclined (tilted) axial line L16 around the axial line L3.

The above-mentioned configuration can be summarized in the following manner.

The cartridge (i.e., the developing cartridge B1) according to the present exemplary embodiment is attachable to and detachable from the apparatus body that includes the rotatable main body side driving member 100 (see FIG. 12).

The developing cartridge B1 is movable in a predetermined direction substantially perpendicular to the rotation axis of the main body side driving member 100 so that the developing cartridge B1 can be attached to and detached from the apparatus body. More specifically, the developing cartridge B1 can be attached to and detached from the apparatus body by moving in the right-and-left direction in FIG. 12B1 to 12B4.

The developing cartridge B1 includes the developing roller 13 (i.e., the developer carrier) as the rotary member that rotates in a state where the developer adheres to the surface thereof (see FIG. 3).

Further, the developing cartridge B1 includes the coupling member 180 that engages with the main body side driving member 100 and the transmitted member (i.e., the drive input gear 27) that can receive a rotational force from the coupling member 180.

The drive input gear 27 includes the accommodating portion 27b configured to accommodate the coupling member 180 and the gear portion 27c configured to transmit the driving force received from the coupling member 180 to the outside of the drive input gear 27 (see FIGS. 17A and 17B). More specifically, the drive input gear 27 is a member that transmits the rotational force (i.e., the driving force) to the developing roller 13 by causing the gear portion 27c to engage with the developing roller gear 29 (see FIG. 6).

Further, the drive input gear 27 includes the protruded portions 27b2 and 27b3 integrally formed with the inner wall of the accommodating portion 27b. These protruded portions 27b2 and 27b3 are portions extending (protruding) from the inner wall of the accommodating portion 27b toward the inner space of the accommodating portion 27b. Respective portions (i.e., the accommodating portion 27b, the gear portion 27c, and the protruded portions 27b2 and 27b3) of the drive input gear 27 are integrally formed.

As illustrated in FIGS. 13A and 13B, the coupling member 180 includes the free end portion 180a, the connected portion 180b, and the linking portion 180c. The free end portion 180a is a portion that contacts the main body side driving member 100. The rotational force receiving portions 180e1 and 180f1 are provided on the free end portion 180a to receive the rotational force from the main body side driving member 100. The connected portion 180b is a portion that can be accommodated in the accommodating portion 27b provided in the rotational force transmitted member (i.e., the driving force input gear 27), as illustrated in FIG. 21B4 and FIG. 23). The connected portion 180*b* includes the recessed portions 180*b*2 and 180*b*3 formed thereon. The protruded portions 27*b*2 and 27*b*3 of the drive input gear 27 can enter the recessed portions 180*b*2 and 180*b*3. The linking portion 180*c* is a portion that connects the free end portion 180*a* to the connected portion 180*b*.

The coupling member 180 is movable relative to the drive input gear 27. More specifically, the coupling member 180 can incline around the connected portion 180*b* that serves as a fulcrum. The coupling member 180 can engage with or disengage from the main body side driving member 100 by changing the inclination angle thereof.

As understood from FIGS. 12B1 to 12B4, the gradient (inclination angle) of the axial line L2 of the coupling member 180 relative to the axial line L3 of the drive input gear 27 or the axial line L1 of the main body side driving member 100 changes before and after the coupling member 180 is engaged with the main body side driving member 100.

For example, when the developing cartridge B1 is taken out of the apparatus body, the state of the coupling member 180 changes in the order of FIGS. 12B4, 12B3, 12B2, and 12B1. More specifically, the coupling member 180 moves away from the drive input gear 27 in such a manner that the rotation center (the axial line L1) of the main body side driving member and the rotation center (the axial line L3) of the transmitted member (i.e., the drive input gear 27) depart from each other in a direction substantially perpendicular to the axial line L1 (namely, in the right-and-left direction in FIG. 12B1 to 12B4). The above-mentioned movement causes the free end portion 180*a* of the coupling member 180 (i.e., the rotational force receiving portions 180*e*1 and 180*f*1) to disengage from the main body side driving member 100. To permit the above-mentioned disengagement, the axial line L2 of the coupling member 180 inclines from the rotation axis L3 of the drive input gear 27. More specifically, the inclination angle of the axial line L2 relative to the axial line L3 becomes greater.

Further, the protruded portions 27*b*2 and 27*b*3 of the drive input gear 27 are engaged with the recessed portions 180*b*2 and 180*b*3 in such a way as to enable the coupling member 180 to incline. More specifically, there is a clearance between the inner wall of the recessed portions 180*b*2 and 180*b*3 and the protruded portions 27*b*2 and 27*b*3. Therefore, the recessed portions 180*b*2 and 180*b*3 are movable relative to the protruded portions 27*b*2 and 27*b*3 (see FIG. 21B4).

Further, when the coupling member 180 rotates, the recessed portions 180*b*2 and 180*b*3 contact the protruded portions 27*b*2 and 27*b*3. Therefore, the drive input gear 27 can receive the rotational force (i.e., the driving force) from the coupling member 180.

The coupling member 180 that includes the recessed portions 180*b*2 and 180*b*3 provided at the connected portion 180*b* is caused to be connected with the drive input gear 27 that includes the protruded portions 27*b*2 and 27*b*3 provided at the accommodating portion 27*b* in the accommodating portion 27*b* and the connected portion 180*b*. Therefore, it is feasible to connect the coupling member 180 to the drive input gear 27 so that the coupling member 180 can incline relative to the drive input gear 27. Thus, it is feasible to provide an easy assembling method capable of connecting the coupling member 180 with the drive input gear 27 without requiring any specific component. In the present exemplary embodiment, an assembly of the coupling member 180 and the drive input gear 27 can be regarded as an integrally rotatable rotary unit.

Next, a second exemplary embodiment of the present invention, which is characterized in that the rotational force is transmitted from the apparatus body A1 side of the drum cartridge C, will be described in detail below. A configuration according to the second exemplary embodiment includes the coupling member 183 described in the first exemplary embodiment. Further, the configuration according to the second exemplary embodiment is similar to that configuration described in the first exemplary embodiment, except for a driving side flange 37 serving as a rotational force transmitted member (i.e., a transmitted member) and a configuration of a drum cartridge C1. Therefore, the same components are denoted by the same reference numerals and redundant description thereof will be avoided.

(Configuration of Coupling Member 183 and Driving Side Flange 37)

A practical relationship between the coupling member 183 and the driving side flange 37 will be described in detail below with reference to the attached drawings.

Figure 31A:
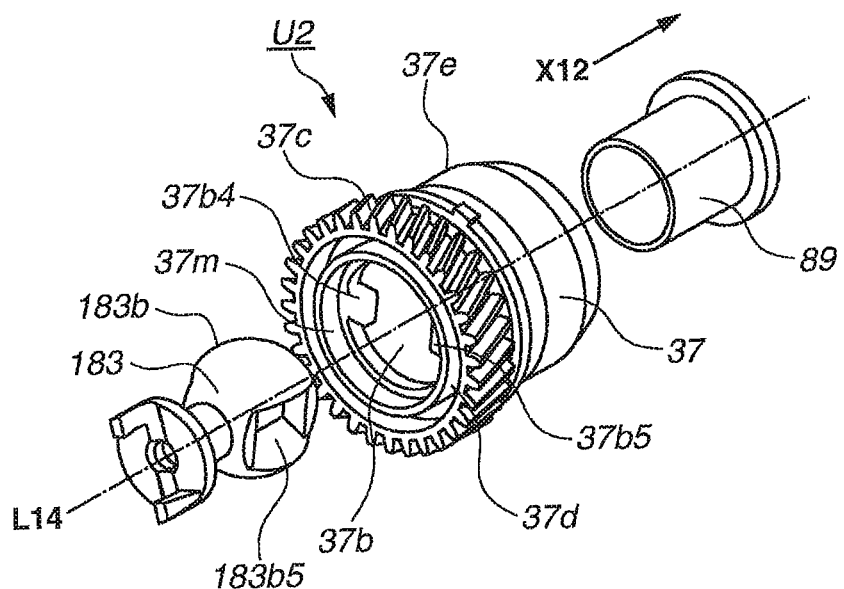
Figure 31B:
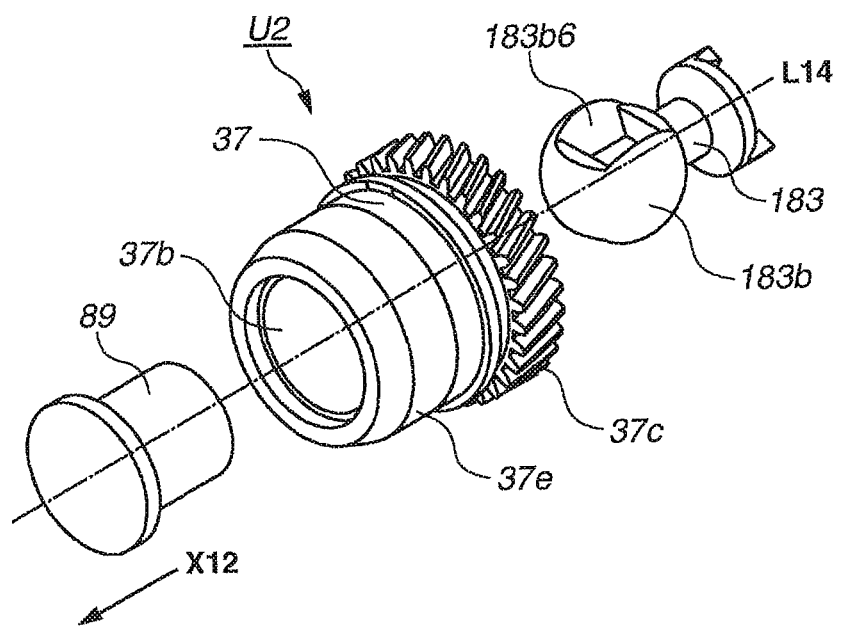
Figure 32:
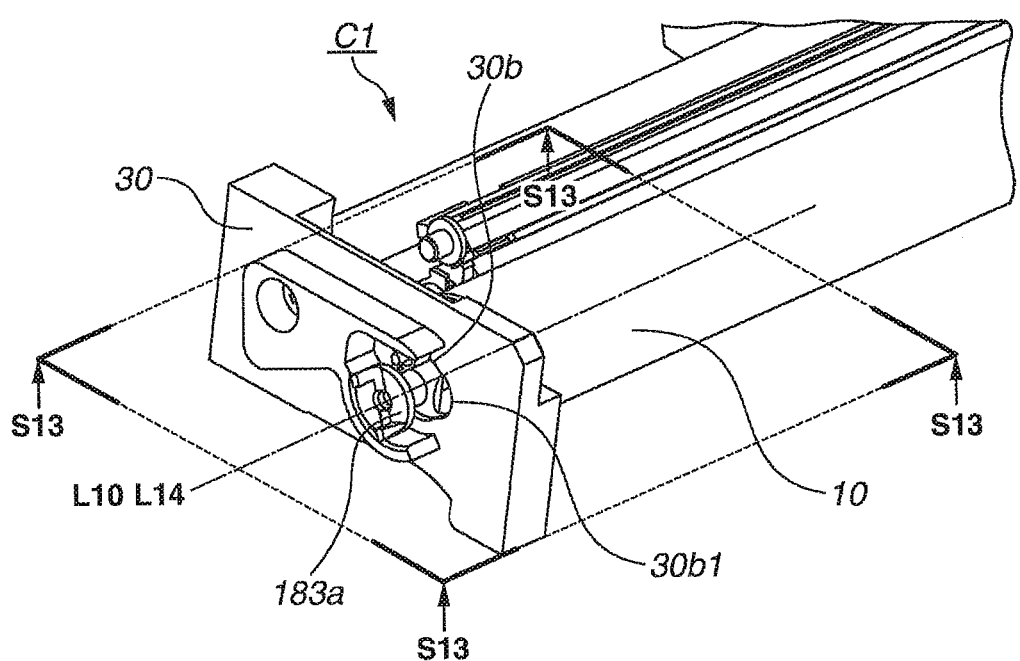
FIG. 32 is a perspective view illustrating another drum cartridge seen from a driving side thereof.
Figure 33:
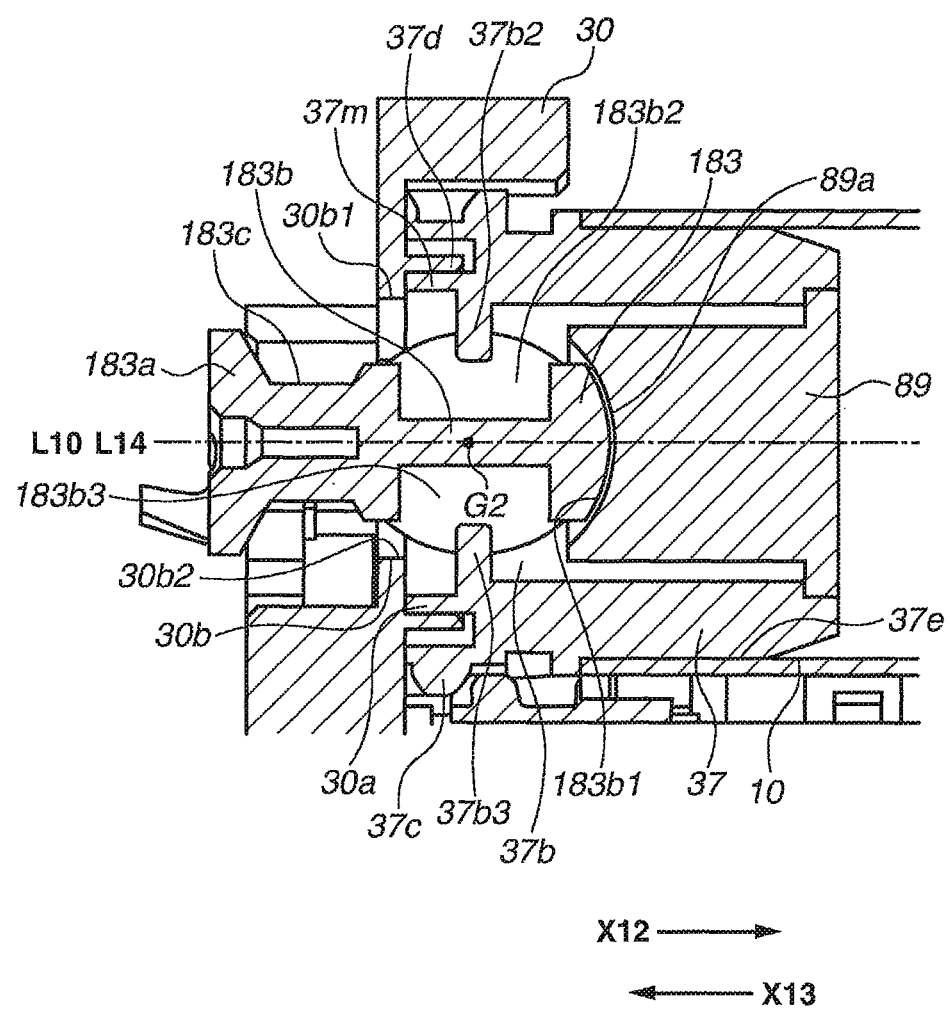
FIG. 33 is a cross-sectional view illustrating the drum cartridge.
Figure 34A:
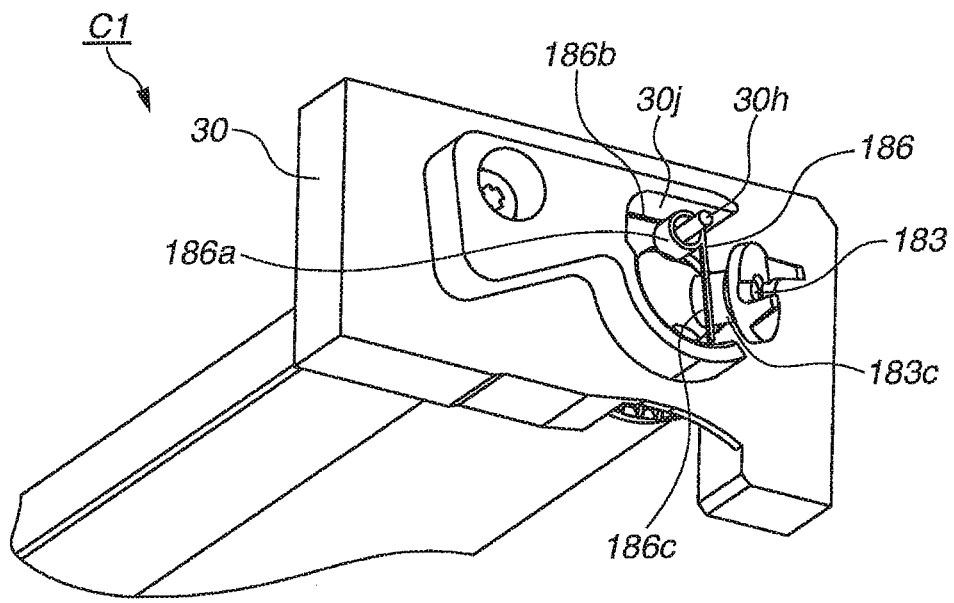
FIG. 34A is a perspective view and FIG. 34B is a side view illustrating the driving side of the drum cartridge.
Figure 34B:
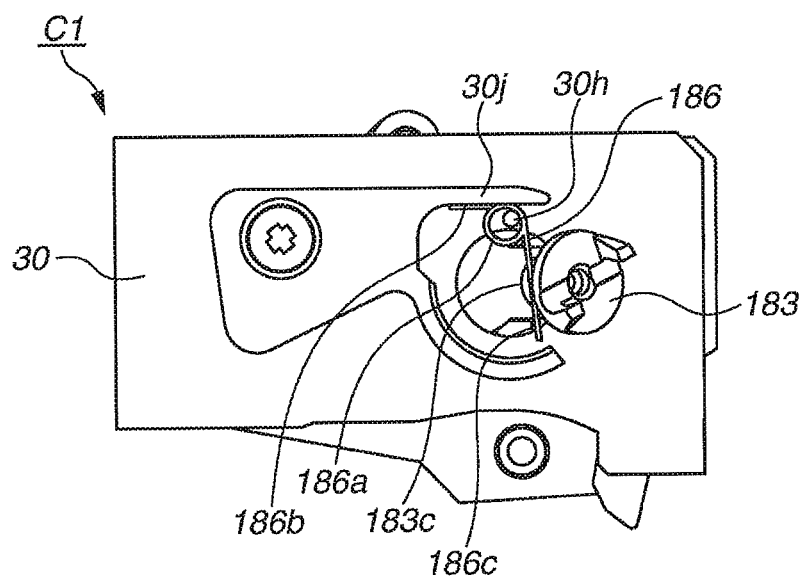

FIGS. 31A and 31B are exploded perspective views illustrating a driving force transmission unit U2. FIG. 31A illustrates the driving force transmission unit U2 seen from a driving side thereof. FIG. 31B illustrates the driving force transmission unit U2 seen from a non-driving side thereof. FIGS. 32 and 33 illustrate a practical configuration of the coupling member 183 and the driving side flange 37. FIG. 32 is a perspective view illustrating the drum cartridge C1 seen from a driving side thereof. FIG. 33 is a cross-sectional view illustrating the coupling member 183 and the driving side flange 37, taken along a flat surface S13 passing through a rotation axis L14 of the coupling member 183 and a rotation axis L10 of the photosensitive drum 10 illustrated in FIG. 32. FIG. 34A is a perspective view illustrating the driving side of the drum cartridge C1. FIG. 34B is a side view illustrating the driving side of the drum cartridge C1.

As illustrated in FIGS. 31A and 31B, the driving side flange unit U2 includes the coupling member 183, the driving side flange 37, and a regulating member (i.e., a first regulating member) 89. The configuration capable of transmitting the driving force from the coupling member 180 to the developing input gear 27 has been described with reference to FIGS. 1A to 1C in the first exemplary embodiment. A configuration for transmitting the driving force from the coupling member 183 to the drum flange 37 according to the present exemplary embodiment illustrated in FIGS. 31A and 31B is similar to the above-mentioned configuration for transmitting the driving force from the coupling member 180 to the drive input gear 27. Therefore, redundant description thereof will be avoided. According to the above-mentioned configuration, the driving force can be transmitted from the driving side flange 37 to the photosensitive drum 10.

The regulating member 89 can enter an accommodating portion 37*a* from an inner side of the developing roller 13 in the longitudinal direction (i.e., from the left side in FIG. 31B). The regulating member 89 collides with the connected portion 183*b* to regulate the movement of the coupling member 183 in such a way as to prevent the coupling member 183 from separating from the driving side flange 37 in a direction X12 illustrated in FIGS. 31A and 31B (see FIGS. 31A, 31B, and 33). More specifically, by colliding with the connected portion 183*b*, the regulating member 89 prevents the coupling member 183 from moving toward the connected portion side (i.e., the inner side in the longitudinal direction of the photosensitive drum 10 or the developing roller 13).

The driving side flange 37 includes a fixed portion 37e, a gear portion 37c (e.g., a helical gear or a spur gear), and a supported portion 37d. The fixed portion 37e is a portion fixed to the photosensitive drum 10 (see FIG. 33). Further, the driving side flange 37 has a hollow shape and includes an accommodating portion 37b provided therein. The accommodating portion 37b has an internal portion that can accommodate the connected portion 183b of the coupling member 183. The connected portion 183b of the coupling member 183 can enter a flange hole 37m provided on the driving side of the driving side flange 37 (see FIG. 31A and FIG. 33). The supported portion 37d is supported by a flange support portion 30a of the drum bearing 30 (see FIGS. 31A, 31B, and 33). The drum bearing 30 includes a coupling hole 30b through which the free end portion 183a of the coupling member 183 can move smoothly (see FIGS. 32 and 33).

Similar to the hole 34a of the developing side cover 34 according to the first exemplary embodiment illustrated in FIG. 23, the coupling hole 30b can prevent the coupling member 183 from falling off.

The configuration of the inclination regulating portion 55a1 of the developing side cover 55 has been described with reference to FIGS. 30A and 30B in the first exemplary embodiment. As illustrated in FIG. 33, the drum bearing 30 according to the present exemplary embodiment includes an inclination regulating portion 30b1, which is similar to the above-mentioned inclination regulating portion 55a1. Therefore, redundant description thereof will be avoided. The engaging portion 27b1 of the drive input gear 27 has been described with reference to FIG. 23 in the first exemplary embodiment. As illustrated in FIG. 33, the driving side flange 37 according to the present exemplary embodiment includes an engaging portion having a configuration similar to that of the above-mentioned engaging portion 27b1. Therefore, redundant description thereof will be avoided.

The configuration of the protruded portions 27b2 and 27b3 of the drive input gear 27 has been described with reference to FIGS. 1A to 1C in the first exemplary embodiment. As illustrated in FIG. 33, the driving side flange 37 according to the present exemplary embodiment includes protruded portions 37b2 and 37b3, which are similar to the above-mentioned protruded portions 27b2 and 27b3. Therefore, redundant description thereof will be avoided.

The configuration capable of transmitting the driving force from the driving force transmission surfaces 180b5 and 180b6 of the coupling member 180 to the driving force receiving surfaces 27b4 and 27b5 of the drive input gear 27 has been described with reference to FIGS. 1A to 1C in the first exemplary embodiment. As illustrated in FIG. 33, the coupling member 183 and the driving side flange 37 according to the present exemplary embodiment are configured to transmit the driving force from the driving force transmission surface to the driving force receiving surface. Therefore, redundant description thereof will be avoided. The regulating member 89 includes a base portion 89a having a semi-spherical shape (see FIG. 33).

A method for supporting each constituent component and a method for linking respective constituent components will be described in detail below with reference to FIG. 33.

Similar to the configurations of the recessed portions 180b2 and 180b3 and the protruded portions 27b2 and 27b3 having been described with reference to FIGS. 1A to 1C in the first exemplary embodiment, the protruded portions 37b2 and 37b3 of the driving side flange 37 can enter recessed portions 183b2 and 183b3 of the coupling member 183. A connected portion 181b is coupled with the accommodating portion 37b so that the above-mentioned state can be realized. The configuration capable of regulating the movement in a direction perpendicular to the axial line L3 by bringing the spherical shape 180b1 of the coupling member 180 into contact with the engaging portion 27b1 has been described with reference to FIG. 23 in the first exemplary embodiment. The coupling member 183 according to the present exemplary embodiment is configured to regulate the movement in a direction perpendicular to the axial line L10 of the driving side flange 37 by bringing the above-mentioned spherical shape into contact with the engaging portion. Therefore, redundant description thereof will be avoided. Further, the movement of the coupling member 183 in the direction X12 can be regulated by bring the spherical shape 183b1 into contact with the base portion 89a of the regulating member 89. Further, the movement of the coupling member 183 in the direction X13 can be regulated by bringing the spherical shape 183b1 into contact with a coupling retainer portion 30b2 of the drum bearing 30. The configuration that the driving force transmission surfaces 180b5 and 180b6 of the coupling member 180 and the driving force receiving surfaces 27b4 and 27b5 of the drive input gear 27 cooperatively determine the positioning in a rotational direction around the axial line L2 has been described with reference to FIGS. 1A to 1C in the first exemplary embodiment. Similarly, the coupling member 183 according to the present exemplary embodiment has driving force transmission surfaces that are cooperative with driving force receiving surfaces of the driving side flange 37 to determine the positioning in a rotational direction around an axial line L14. In configuration, the coupling member 183 and the driving side flange 37 are similar to the above-mentioned combination of the coupling member 180 the drive input gear 27. Therefore, redundant description thereof will be avoided. The configuration that the reverse rotation regulating surfaces 180b7 and 180b8 of the coupling member 180 and the reverse rotation contact surfaces 27b6 and 27b7 of the drive input gear 27 cooperatively determine the positioning in a direction opposite to the rotational direction around the rotation axis L2 has been described with reference to FIGS. 1A and 1C in the first exemplary embodiment. Similarly, the coupling member 183 according to the present exemplary embodiment has reverse rotation regulating surfaces that are cooperative with reverse rotation contact surfaces of the driving side flange 37 to determine the positioning in a direction opposite to the rotational direction around the rotation axis L14. In configuration, the coupling member 183 and the driving side flange 37 are similar to the above-mentioned combination of the coupling member 180 and the drive input gear 27. Therefore, redundant description thereof will be avoided.

As mentioned above, the coupling member 183 can be linked with the driving side flange 37 so that the coupling member 183 can incline relative to the driving side flange 37.

Further, as mentioned above, the accommodating portion 37b, the coupling retainer portion 30b2, and the base portion 89a cooperatively regulate the position of the coupling member 183 in a direction perpendicular to the axial line L10 of the spherical shape 183b1 as well as in the directions X12 and X13. Accordingly, when the coupling member 183 inclines (tilts) about the center G2 of the spherical shape 183b1, the intersection of the rotation axis L10 of the photosensitive drum and the rotation axis L14 of the coupling member 183 substantially coincides with the center G2. In other words, the center G2 is an inclination (tilt) center of the coupling member 183.

Further, as illustrated in FIG. 34, a coupling spring 186 is provided on the drum bearing 30. For example, the coupling spring 186 is a torsion coil spring. A positioning portion 186a of the coupling spring 186 is supported by a spring supporting portion 30h of the drum bearing 30. Further, one end portion 186b of the coupling spring 186 is fixed to a spring contact portion 30j of the drum bearing 30. Further, the other end portion 186c of the coupling spring 186 is brought into contact with the linking portion 183c of the coupling member 183. Therefore, a restorative force of the coupling spring 186 causes the coupling member 183 to incline.

(Inclining (Tilting) Operation of Coupling Member 183)

An inclining (tilting) operation of the coupling member 183 will be described in detail below.

According to the configuration according to the first exemplary embodiment illustrated in FIGS. 30A and 30B, the linking portion 183c of the coupling member 183 collides with the inclination regulating portion 55a1 of the developing side cover 55 so that the coupling member 183 can take the inclined posture. Similarly, the linking portion 183c according to the present exemplary embodiment is configured to collide with the inclination regulating portion 36b1 of the drum bearing 30 so that the coupling member 183 can take the inclined posture. In this case, the axial line L3 illustrated in FIG. 30B is comparable to the rotation axis L10 of the photosensitive drum 10 according to the present exemplary embodiment. As mentioned above, the coupling member 183 can incline (tilt) from the rotation axis L10 of the photosensitive drum 10 with a predetermined inclination angle in substantially all directions. More specifically, the coupling member 183 can incline (tilt) with respect to the axial line L10 in any direction. Further, the coupling member 183 can swing relative to the axial line L10 in any direction. Further, the coupling member 183 can turn around the axial line L10 in substantially all directions. In the present exemplary embodiment, the turning of the coupling member 183 can be defined as a rotational motion of the inclined (tilted) axial line L14 around the axial line L10.

In the present exemplary embodiment, an assembly of the coupling member 183, the driving side flange 37, the regulating member 89, and the photosensitive drum 10 can be regarded as an integrally rotatable rotary unit.

According to the configuration described in the second exemplary embodiment, the driving force is directly transmitted from the coupling member 183 to the photosensitive drum 10. A similar configuration is applicable to the developing roller 13 or other rotary members.

The above-mentioned configuration can be summarized in the following manner.

The coupling member 183 that includes the recessed portions 183b2 and 183b3 provided at the connected portion 183b is caused to be connected with the driving side flange 37 that includes the protruded portions 37b2 and 37b3 provided at the accommodating portion 37b in the accommodating portion 37b and the connected portion 181b. Therefore, it is feasible to connect the coupling member 183 to the driving side flange 37 so that the coupling member 183 can incline relative to the driving side flange 37. Thus, it is feasible to provide an easy assembling configuration that does not require any specific component even in a configuration that the rotational force is transmitted to the photosensitive drum 10 from the apparatus body A1 side of the drum cartridge C1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A coupling member for an image forming apparatus cartridge, the coupling member comprising:
    a first end portion having a first recess and a second recess formed therein, the first and second recesses being positioned on opposite sides of the first end portion, and the first and second recesses being separated from each other by a part of the first end portion, with (i) a first surface, a second surface, and a third surface facing the first recess, the first and second surfaces being positioned opposite to each other and the third surface being positioned between the first and second surfaces, and (ii) a first surface, a second surface, and a third surface facing the second recess, the first and second surfaces being positioned opposite to each other and the third surface being positioned between the first and second surfaces; and
    a second end portion opposite to the first end portion, the second end portion including at least one projection configured to receive a rotational force.

2. The coupling member according to claim 1, further comprising a connecting portion that connects the first end portion and the second end portion.

3. The coupling member according to claim 2, wherein, as measured along a line perpendicular to an axis of the coupling member, a distance from the axis to an outermost surface of the connecting portion is less than a distance from the axis to at least part of an outermost surface of the second end portion.

4. The coupling member according to claim 1, wherein the second end portion includes two projections that are positioned on opposite sides of the second end portion.

5. The coupling member according to claim 4, wherein the second end portion includes a surface with a recess formed therein, with the two projections projecting from the surface.

6. The coupling member according to claim 1, further comprising a projection extending from the first end portion in a direction away from the second end portion.

7. The coupling member according to claim 1, wherein the third surface facing the first recess and the third surface facing the second recess are parallel to each other.

8. The coupling member according to claim 7, wherein the third surface facing the first recess and the third surface facing the second recess extend parallel to a rotational axis of the coupling member.

9. The coupling member according to claim 1, wherein the third surface facing the first recess and the third surface facing the second recess extend parallel to a rotational axis of the coupling member.

10. A coupling member for an image forming apparatus cartridge, the coupling member comprising:
    a first end portion including an outer surface, with first and second recesses formed in opposite sides of the outer surface, the first and second recesses being separated from each other by a part of the first end portion, wherein a surface of first end portion facing the first recess extends parallel to a surface of the first end portion that faces the second recess; and
    a second end portion opposite to the first end portion, the second end portion including at least one projection configured to receive a rotational force.

11. The coupling member according to claim 10, further comprising a connecting portion that connects the first end portion and the second end portion.

12. The coupling member according to claim 11, wherein, as measured along a line perpendicular to an axis of the coupling member, a distance from the axis to an outermost surface of the connecting portion is less than a distance from the axis to at least part of an outermost surface of the second end portion.

13. The coupling member according to claim 10, wherein the second end portion includes two projections that are positioned on opposite sides of the second end portion.

14. The coupling member according to claim 13, wherein the second end portion includes a surface with a recess formed therein, with the two projections projecting from the surface.

15. The coupling member according to claim 10, further comprising a projection extending from the outer surface of the first end portion in a direction away from the second end portion.

16. The coupling member according to claim 10, wherein the surface of first end portion facing the first recess and the surface of first end portion facing the second recess are parallel with each other.

17. The coupling member according to claim 16, wherein the surface of first end portion facing the first recess and the surface of first end portion facing the second recess extend parallel to a rotational axis of the coupling member.

18. The coupling member according to claim 10, wherein the surface of first end portion facing the first recess and the surface of first end portion facing the second recess extend parallel to a rotational axis of the coupling member.

19. A developing cartridge comprising:
a casing;
developer contained within the casing;
a developing roller rotatably supported by the casing, the developing roller being configured to carry the developer on a surface thereof;
a coupling member operatively connected to the developing roller such that the coupling member is capable of transmitting a rotational force to the developing roller, the coupling member comprising:
a first end portion having a first recess and a second recess formed therein, the first and second recesses being positioned on opposite sides of the first end portion, and the first and second recesses being separated from each other by a part of the first end portion, with (i) a first surface, a second surface, and a third surface facing the first recess, the first and second surfaces being positioned opposite to each other and the third surface being positioned between the first and second surfaces, and (ii) a first surface, a second surface, and a third surface facing the second recess, the first and second surfaces being positioned opposite to each other and the third surface being positioned between the first and second surfaces; and
a second end portion opposite to the first end portion, the second end portion including at least one projection configured to receive a rotational force.

20. The developing cartridge according to claim 19, wherein the coupling member further comprises a connecting portion that connects the first end portion and the second end portion.

21. The developing cartridge according to claim 20, wherein, as measured along a line perpendicular to an axis of the coupling member, a distance from the axis to an outermost surface of the connecting portion is less than a distance from the axis to at least part of an outermost surface of the second end portion.

22. The developing cartridge according to claim 19, wherein the second end portion of the coupling member includes two projections that are positioned on opposite sides of the second end portion.

23. The developing cartridge according to claim 22, wherein the second end portion includes a surface with a recess formed therein, with the two projections projecting from the surface.

24. The developing cartridge according to claim 19, further comprising a projection extending from the first end portion in a direction away from the second end portion.

25. The developing cartridge according to claim 19, wherein the third surface facing the first recess and the third surface facing the second recess are parallel with each other.

26. The developing cartridge according to claim 25, wherein the third surface facing the first recess and the third surface facing the second recess extend parallel to a rotational axis of the coupling member.

27. The developing cartridge according to claim 19, wherein the third surface facing the first recess and the third surface facing the second recess extend parallel to a rotational axis of the coupling member.

28. A developing cartridge comprising:
a casing;
developer contained within the casing;
a developing roller rotatably supported by the casing, the developing roller being configured to carry the developer on a surface thereof;
a coupling member operatively connected to the developing roller such that the coupling member is capable of transmitting a rotational force to the developing roller, the coupling member comprising:
a first end portion including an outer surface, with first and second recesses formed in opposite sides of the outer surface, the first and second recesses being separated from each other by a part of the first end portion, wherein a surface of first end portion facing the first recess extends parallel to a surface of the first end portion that faces the second recess; and
a second end portion opposite to the first end portion, the second end portion including at least one projection configured to receive a rotational force.

29. The developing cartridge according to claim 28, wherein the coupling member further comprises a connecting portion that connects the first end portion and the second end portion.

30. The developing cartridge according to claim 29, wherein, as measured along a line perpendicular to an axis of the coupling member, a distance from the axis to an outermost surface of the connecting portion is less than a distance from the axis to at least part of an outermost surface of the second end portion.

31. The developing cartridge according to claim 28, wherein the second end portion of the coupling member includes two projections that are positioned on opposite sides of the second end portion.

32. The developing cartridge according to claim 31, wherein the second end portion includes a surface with a recess formed therein, with the two projections projecting from the surface.

33. The developing cartridge according to claim 28, further comprising a projection extending from the outer surface of the first end portion in a direction away from the second end portion.

34. The developing cartridge according to claim 28, wherein the surface of first end portion facing the first recess and the surface of first end portion facing the second recess are parallel with each other.

35. The developing cartridge according to claim 34, wherein the surface of first end portion facing the first recess and the surface of first end portion facing the second recess extend parallel to a rotational axis of the coupling member.

36. The developing cartridge according to claim 28, wherein the surface of first end portion facing the first recess and the surface of first end portion facing the second recess extend parallel to a rotational axis of the coupling member.

* * * * *